(12) United States Patent
Ono

(10) Patent No.: US 8,747,030 B2
(45) Date of Patent: Jun. 10, 2014

(54) TOOL HEAD

(75) Inventor: Akira Ono, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 358 days.

(21) Appl. No.: 12/787,891

(22) Filed: May 26, 2010

(65) Prior Publication Data

US 2011/0164931 A1 Jul. 7, 2011

(30) Foreign Application Priority Data

Jan. 7, 2010 (JP) .................................. 2010-002190

(51) Int. Cl.
*B23C 5/22* (2006.01)
*B23F 21/12* (2006.01)

(52) U.S. Cl.
CPC .. *B23C 5/22* (2013.01); *B23F 21/12* (2013.01)
USPC ....................................................... 407/22

(58) Field of Classification Search
CPC ............. B23C 5/22; B23C 5/24; B23F 21/12; B23F 21/22
USPC ................... 407/20, 21, 22, 36, 40, 41, 44, 49
See application file for complete search history.

(56) References Cited

U.S. PATENT DOCUMENTS

| | | | | |
|---|---|---|---|---|
| 2,270,003 A * | 1/1942 | Head | ................................ | 407/22 |
| 2,778,092 A * | 1/1957 | Bader | .............................. | 407/41 |
| 3,129,615 A * | 4/1964 | Lombardo | .................... | 408/240 |
| 3,837,059 A * | 9/1974 | Pristavnik | ........................ | 407/43 |
| 4,078,868 A * | 3/1978 | Erkfritz | ........................... | 407/48 |
| 4,329,091 A * | 5/1982 | Erkfritz | ........................... | 407/41 |
| 4,530,623 A * | 7/1985 | Kotthaus | .......................... | 407/22 |
| 5,890,846 A | 4/1999 | Clark et al. | | |
| 5,934,841 A * | 8/1999 | Rutschke et al. | ............... | 407/22 |
| 6,004,078 A | 12/1999 | Clark et al. | | |
| 6,609,858 B1 * | 8/2003 | Francis et al. | ................... | 407/21 |
| 2003/0044246 A1 * | 3/2003 | Erickson et al. | ................ | 407/21 |

FOREIGN PATENT DOCUMENTS

| | | |
|---|---|---|
| JP | H08-1088316 | 4/1996 |
| JP | H10-058232 | 3/1998 |
| WO | 97/39851 | 10/1997 |

* cited by examiner

*Primary Examiner* — Andrea Wellington
*Assistant Examiner* — Alan Snyder
(74) *Attorney, Agent, or Firm* — Konomi Takeshita

(57) ABSTRACT

A tool head is provided that can easily correct the shape of a tooth surface. Slot holes are formed in a main head body, that tilt either distally or proximately to the central axis of rotation (CAR) of the main head body. Concave tooth surface blades for cutting concave tooth surfaces are installed in the slot holes that tilt distally, and convex tooth surface blades for cutting convex tooth surfaces are formed in the slot holes that tilt proximately. By changing the amount that the concave or convex tooth surface blades protrude, the cutting portions of the concave or convex tooth surface blades are moved in either distal or proximate directions. By changing the distance from the CAR to the cutting portions in this manner, it is possible to correct the shape of the concave or convex tooth surfaces of a bevel gear.

10 Claims, 19 Drawing Sheets

11: MAIN HEAD BODY
12: CONCAVE TOOTH SURFACE BLADE (BLADE)
12a: CUTTING PORTION
13: CONVEX TOOTH SURFACE BLADE (BLADE)
13a: CUTTING PORTION
21: SLOT HOLE (FIRST INSTALLATION HOLE, INSTALLATION HOLE)
23: SLOT HOLE (SECOND INSTALLATION HOLE, INSTALLATION HOLE)

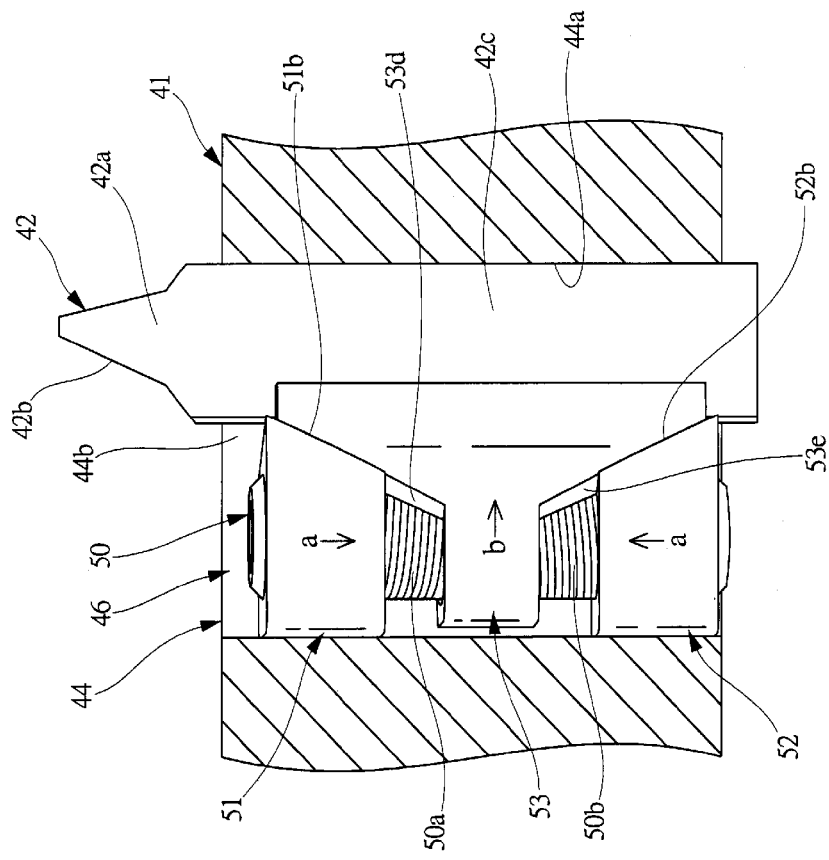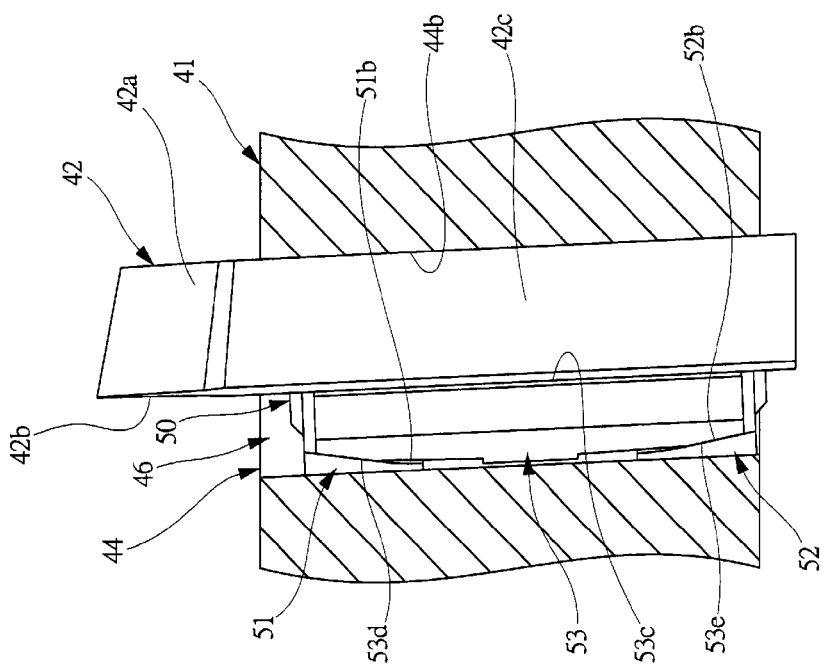
FIG. 17A
FIG. 17B

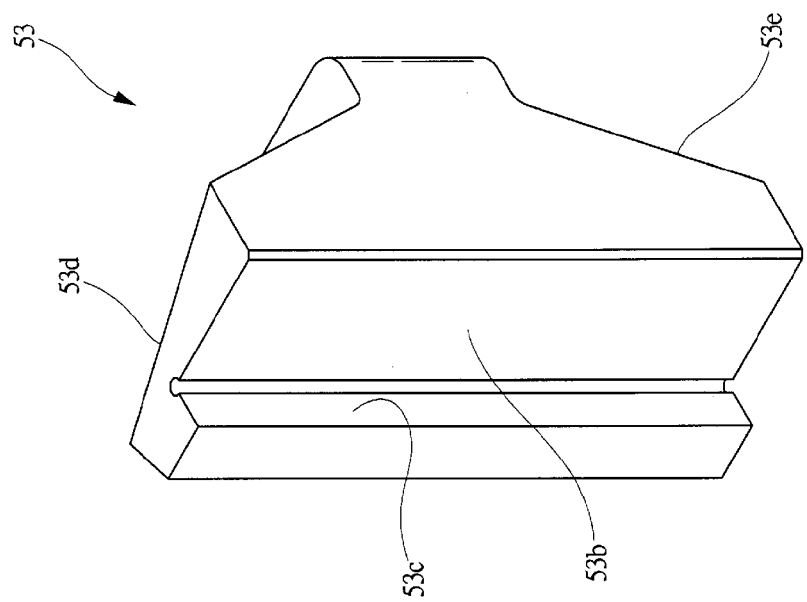
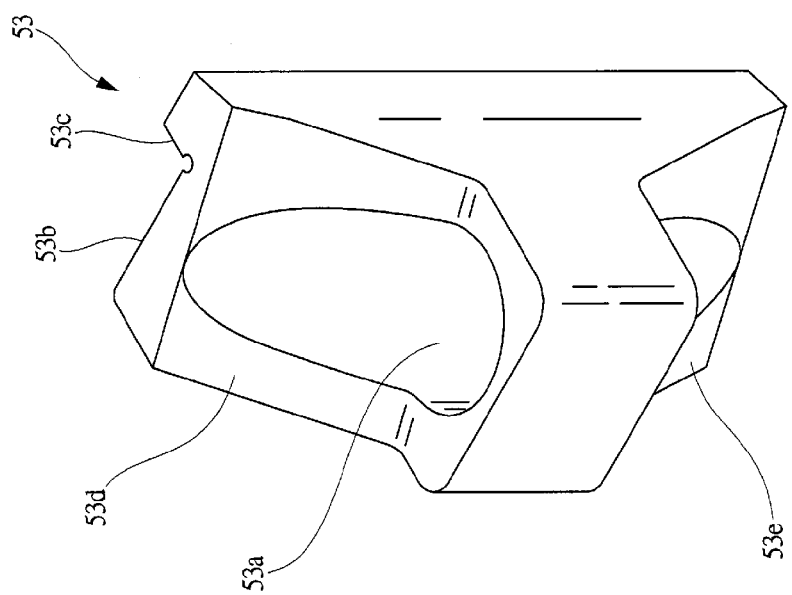

TOOL HEAD

CROSS REFERENCE TO RELATED APPLICATIONS

This application claims priority under 35 U.S.C. 119 based upon Japanese Patent Application Serial No. 2010-002190, filed on Jan. 7, 2010. The entire disclosure of the aforesaid application is incorporated herein by reference.

FIELD OF THE INVENTION

The present invention relates to a tool head for cutting bevel gears.

BACKGROUND OF THE INVENTION

Bevel gears, such as hypoid gears having curved teeth, are cut using a disk shaped tool head that comprises a plurality of blades (for example, refer to patent documents 1, 2 and 3). This kind of tool head is used by attaching the tool head to a tooth cutter, and by controlling the tool head and the work such that they have a specified positional relationship, it is possible to cut concave tooth surfaces or convex tooth surfaces having a specified shape into the work.

REFERENCE DOCUMENTS

[Patent Document 1] Japanese Unexamined Patent Application Publication no. H8-108316
[Patent Document 2] Japanese Unexamined Patent Application no. H10-58232
[Patent Document 3] WO 97/039,851

However, in the case of the tool heads disclosed in patent documents 1 and 2, it is not possible to change the installation radius of the blades, so when correcting the shape of the tooth surfaces and making fine adjustments around the teeth of the bevel gear, it is necessary to regrind the cutting portion of the blades. To regrind the blades in this way in order to make fine adjustments around the teeth of a bevel gear causes an increase in the manufacturing cost of the bevel gear.

Moreover, in the case of the tool heads disclosed in patent documents 1 and 2, blades are attached perpendicular to the main body of the head, so in order to avoid interference between the surface of a tooth and blade that face the tooth surface of a tooth being cut, it is necessary to also grind the blade on the opposite side from the cutting portion. This kind of blade grinding causes an increase in the production cost of the blades, and thus causes an increase in the manufacturing cost of the bevel gear.

Furthermore, in the case of the tool heads disclosed in patent documents 1 to 3, after the blades are inserted into installation holes in the main body of the head, the blades are fastened by tightening bolt members from the outer surface of the head body. However, when the blades are fastened by pressing them from the outer side toward the inner side of the head body, it is possible that the blades could become loose due to the direction that the cutting load acts in. For example, in the case where a cutting load that faces toward the outer side of the head body is applied to a blade, or in other words, when the bolt members receive the cutting load, there is a possibility that the bolt members will become loose due to the cutting load. Loosening of the bolt members that fasten the blades in this way causes a decrease in the cutting precision of the work.

SUMMARY OF THE INVENTION

An object of the present invention is to provide a tool head of which it is possible to easily correct the tooth surface shape.

A further object of the present invention is to lower the production cost of blades that are provided in the tool head.

Yet a further object of the present invention is to improve the cutting precision by preventing loosening of the blades.

The tool head of the present invention is a tool head for cutting bevel gears, comprising: a disk shaped main head body in which a plurality of installation holes that are tilted in a distal or proximate direction from a central axis of rotation (hereinafter referred to as "CAR") of said main head body are formed along a circumferential direction of the main head body; blades that are installed in the installation holes such that they can freely move outwardly and inwardly within the installation holes, having cutting portions on the tip end thereof that protrude from one end surface of the main head body; and fastening mechanisms that are provided on the main head body and fasten the blades to the main head body such that the blades protrude a discretionary amount; wherein by changing the amount that the blades protrude, the distance from the CAR of the main head body to the cutting portions is changed.

In the tool head of the present invention, installation reference surfaces against which the blades come in contact are formed in the installation holes on the opposite side from the direction of rotation of the main head body.

In the tool head of the present invention, concave tooth surface blades for cutting concave tooth surfaces of the bevel gear, and convex tooth surface blades for cutting convex tooth surfaces of the bevel gear are provided as the blades; first installation holes in which the concave tooth surface blades are installed, and second installation holes in which the convex tooth surface blades are installed are provided as the installation holes; and of the installation holes, either the first installation holes or the second installation holes are formed such that they proximately to the CAR of the main head body, and the other installation holes are formed such that they tilt distally to the CAR of the main head body.

The tool head of the present invention is a tool head for cutting bevel gears, comprising: a disk shaped main head body in which installation holes having a first reference surface and second reference surface in one corner thereof are formed in the thickness direction of the main head body; blades having a base section that is inserted in the installation holes of the main head body, and cutting portions that are continuous with the base sections and that protrude from one end surface of the main head body; and fastening mechanisms that are installed in the main head body and fasten the blades by pressing the base sections of the blades against the first reference surfaces and the second reference surfaces; wherein the first reference surface and the second reference surfaces are formed in a direction such that they receive the cutting load acting on the blades.

In the tool head of the present invention, the fastening mechanisms press the blades distally from the CAR of the main head body against the first reference surfaces and the second reference surfaces.

In the tool head of the present invention, the first reference surfaces and the second reference surfaces tilt with respect to the direction of rotation of the main head body.

The tool head of the present invention is, a tool head for cutting bevel gears, comprising: a disk shaped main head body in which installation holes each having a first reference surface and a second reference surface at one corner are formed in the thickness direction thereof; blades having base sections that are inserted into the installation holes of the main head body, and cutting portions that are continuous with the base sections and that protrude from one end surface of the main head body; and fastening mechanisms that are provided in the installation holes of the main head body, and that fasten the blades by pressing the base section of the blades against the first and second reference surfaces of the installation holes; wherein the blades are located further distally from the CAR of the main head body than the fastening mechanisms, and the fastening mechanisms are located further proximately to the CAR of the main head body than the blades.

In the tool head of the present invention, the fastening mechanism comprises: a screw member that is accommodated in the installation hole; a tightening member that is attached to the screw member and that can freely move in the axial direction of the screw member; and a pressing member that can freely move in the axial direction of the screw member, and comes in contact with the tightening member by way of an inclined surface; wherein the pressing member presses the base section of the blade against the first and second reference surfaces.

In the tool head of the present invention, a first tightening member that is installed on one end side of the screw member, and a second tightening member that is installed on the other end side of the screw member are provided as the tightening member; and a first inclined surface that comes in contact with an inclined surface of the first tightening member, and a second inclined surface that comes in contact with an inclined surface of the second tightening member are formed on the pressing member.

In the tool head of the present invention, the cross-sectional shape of the base section of the blades is formed into a quadrangular shape, and a first pressing surface and second pressing surface that come in contact with one corner of the base section are formed on the pressing member.

In the tool head of the present invention, the blades are convex tooth surface blades for cutting convex tooth surfaces of the bevel gear.

With the present invention, the blades are installed in the installation holes that are inclined distally or proximately to the CAR of the main head body, so that by changing the amount that the blades protrude, it is possible to change the distance from the CAR of the main head body to the cutting portions of the blades. By doing so, it becomes possible to easily correct the shape of the tooth surfaces of the teeth of the bevel gear without having to perform work such as regrinding the blades.

With the present invention, the blades are installed in the installation holes that are inclined in a distal or proximate direction from the CAR, so it is possible to reduce or eliminate the amount of grinding on the opposite side of the blades from the cutting portions, and thus it is possible to the lower production cost of the blades.

With the present invention, the first reference surfaces and second reference surfaces that are pressed by the blades are formed in a direction such that they receive the cutting load that acts on the blades, so it is possible to prevent loosening of the blades during cutting. This makes it possible to improve cutting precision.

With the present invention, the blades are arranged further distally to the CAR of the main head body than the fastening mechanisms, and the fastening mechanisms are arranged further proximately to the CAR of the main head body than the blades, so that even when the cutting load acts on the blades in the distal direction, it is possible to prevent loosening of the blades. This makes it possible to improve cutting precision.

Other features and advantages of the present invention will become apparent from the following detailed description, taken in conjunction with the accompanying drawings, which illustrate, by way of example, the principles of the invention.

BRIEF DESCRIPTION OF THE DRAWINGS

FIG. 17A is a cross-sectional view illustrating the installed state of a concave tooth surface blade as seen from the direction of arrow 'a' in FIG. 15; and FIG. 17B is a cross-sectional view illustrating the installed state of a concave tooth surface blade as seen from the direction of arrow 'b' in FIG. 15.

FIGS. 19A and 19B are perspective views illustrating a holding piece of a fastening mechanism.

DETAILED DESCRIPTION OF THE INVENTION

Figure 1A:
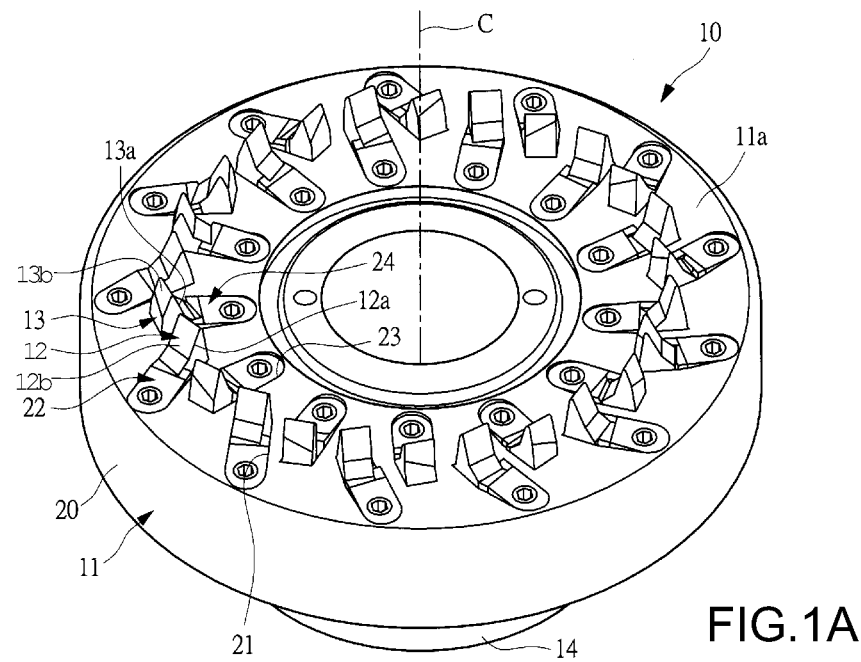
FIG. 1A is a perspective view illustrating a tool head of an embodiment of the present invention.
Figure 1B:
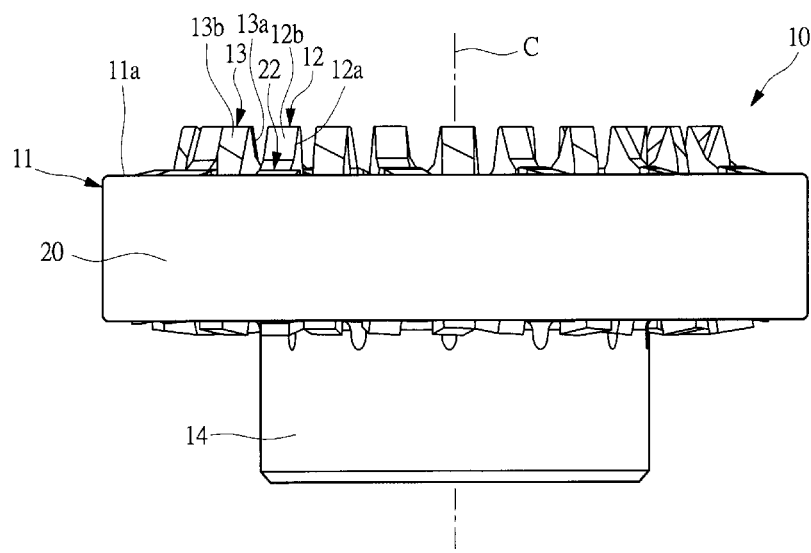
FIG. 1B is a side view illustrating the tool head.
Figure 2:
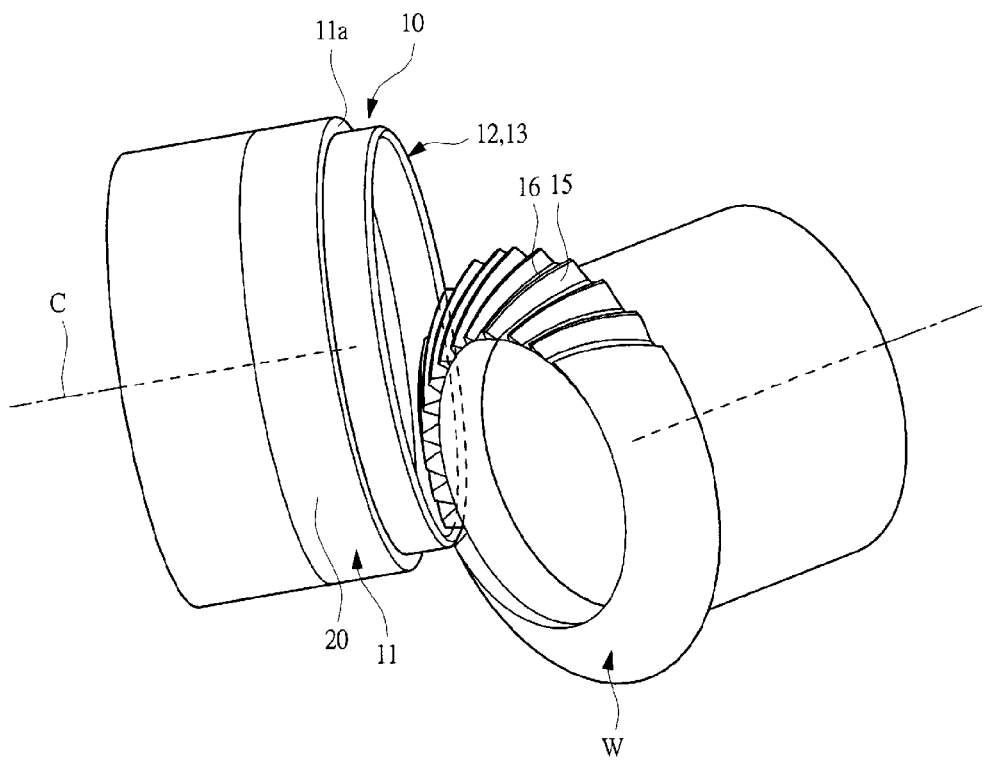
FIG. 2 is a diagram illustrating the cutting state of a bevel gear that is cut by the tool head.

In the following, preferred embodiments of the present invention will be described in detail with reference to the accompanying, exemplary drawings. FIG. 1A is a perspective view illustrating a tool head 10 of one embodiment of the present invention; and FIG. 1B is a side view illustrating the tool head 10. In addition, FIG. 2 is a diagram illustrating the state of cutting work W by the tool head 10. As illustrated in FIG. 1A and FIG. 1B, the tool head 10 has a disk shaped head body 11, with a plurality of concave tooth surface blades (blades) 12 and convex tooth surface blades (blades) 13 being attached to the head body 11. In addition, cutting portions 12a that cut concave tooth surfaces 15 of a bevel gear are formed on the tip ends of the concave tooth surface blades 12, and cutting portions 13a that cut convex tooth surfaces 16 of the bevel gear are formed on the tip ends of the convex tooth surface blades 13. Also, the blades 12, 13 that are attached to the head body 11 are fastened in a state such that the cutting portions 12a, 13a protrude from one end surface 11a of the main head body 11. In this way, cutting sections 12b, 13b comprising the cutting portions 12a, 13a are formed on the tip ends of the concave tooth surface blades 12 and convex tooth surface blades 13.

Moreover, an installation boss 14 is provided on the main head body 11, and the tool head 10 is mounted in a tooth cutter (not shown in the figure) by way of this installation boss 14. As illustrated in FIG. 2, by the tooth cutter moving the tool head 10 and work W along specified paths while rotating the tool head 10, it is possible for the tooth cutter to cut concave tooth surfaces 15 and convex tooth surfaces 16 in the work W. The movement path of the tool head 10 and work W is calculated based on the design of the bevel gear that is inputted into the tooth cutter and the dimensions of the tool head 10.

Figure 3:
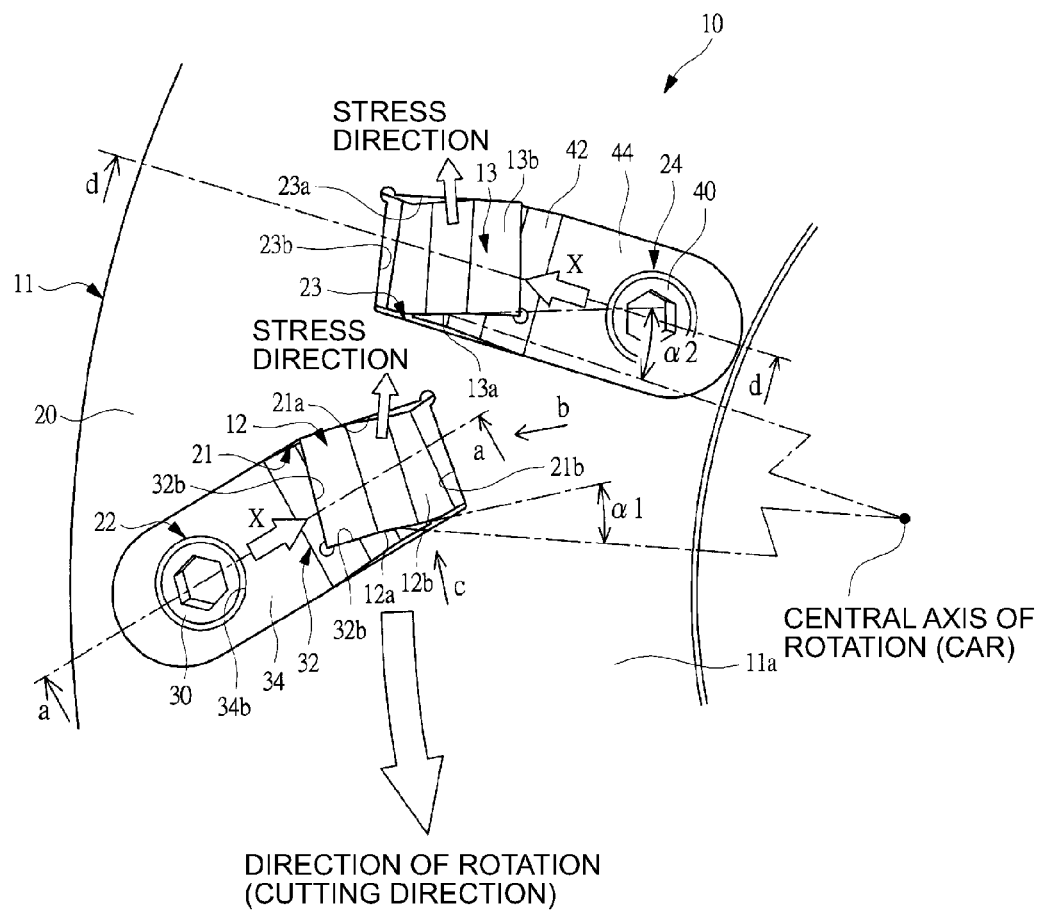
FIG. 3 is a partially enlarged top view illustrating the tool head.

FIG. 3 is a partially enlarged top view illustrating the tool head 10. As illustrated in FIG. 1 and FIG. 3, a plurality of slot holes 21 are formed at locations in the circumferential direction around the outer side of the disk section 20 of the main head body 11 as first installation holes (installation holes) in which the concave tooth surface blades 12 are installed. The concave tooth surface blades 12 are inserted in the slot holes 21 such that they can freely move inwardly and outwardly, and fastening mechanisms 22 are installed that fasten the concave tooth surface blades 12 at a discretionary protruding amount. Similarly, a plurality of slot holes 23 are formed at locations in the circumferential direction around the inner side of the disk section 20 of the main head body 11 as second installation holes (installation holes) in which the convex tooth surface blades 13 are installed. The convex tooth surface blades 13 are inserted in the slot holes 23 such that they can freely move inwardly and outwardly, and fastening mechanisms 24 are installed that fasten the convex tooth surface blades 13 at a discretionary protruding amount. As described above, concave tooth surface blades 12 and fastening mechanisms 22 are assembled in the slot holes 21 that are formed in the thickness direction of the main head body 11. Also, convex tooth surface blades 13 and fastening mechanisms 24 are assembled in the slot holes 23 that are formed in the thickness direction of the main head body 11. In this way, construction is such that the blades 12, 13 and fastening mechanisms 22, 24 are assembled in the slot holes 21, 23, so it is possible to reduce the weight of the main head body 11 by making the opening of the slot holes 21, 23 large.

Figure 4:
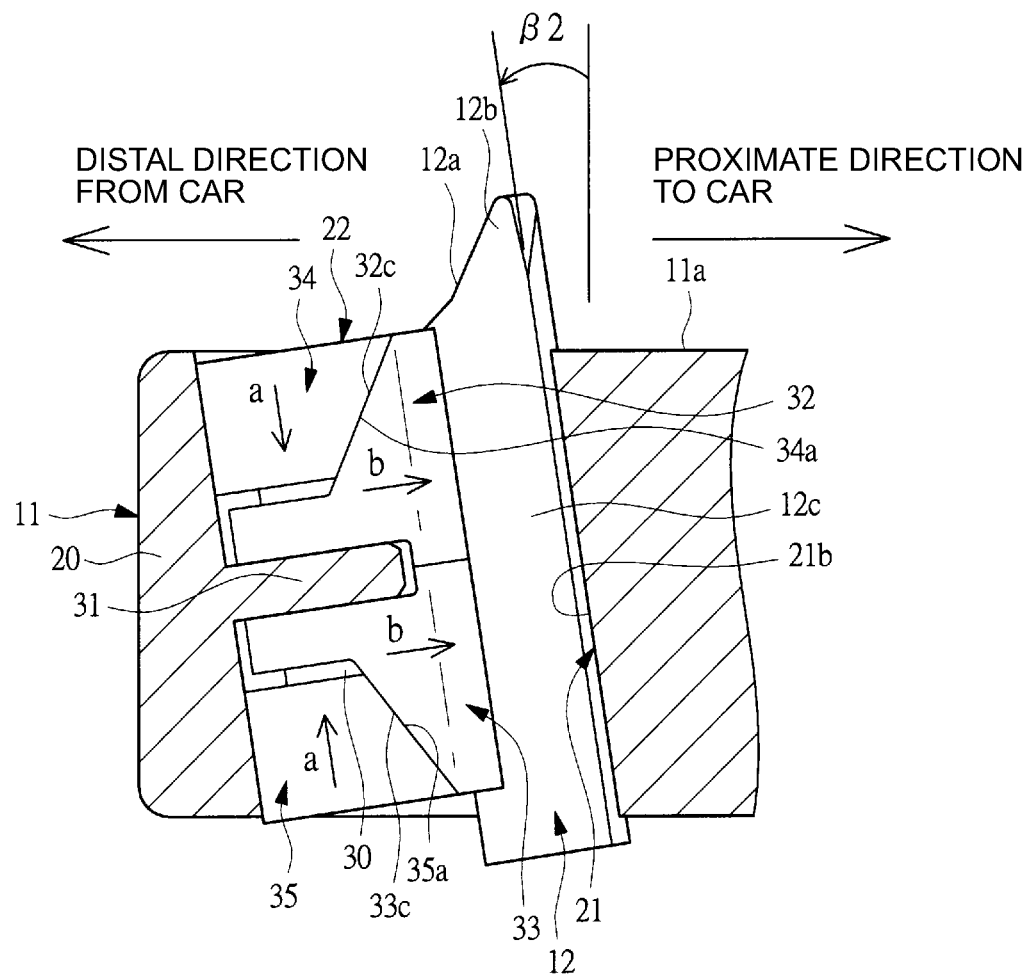
FIG. 4 is a cross-sectional view along the section line a-a in FIG. 3, and illustrates the installed state of a concave tooth surface blade.
Figure 5:
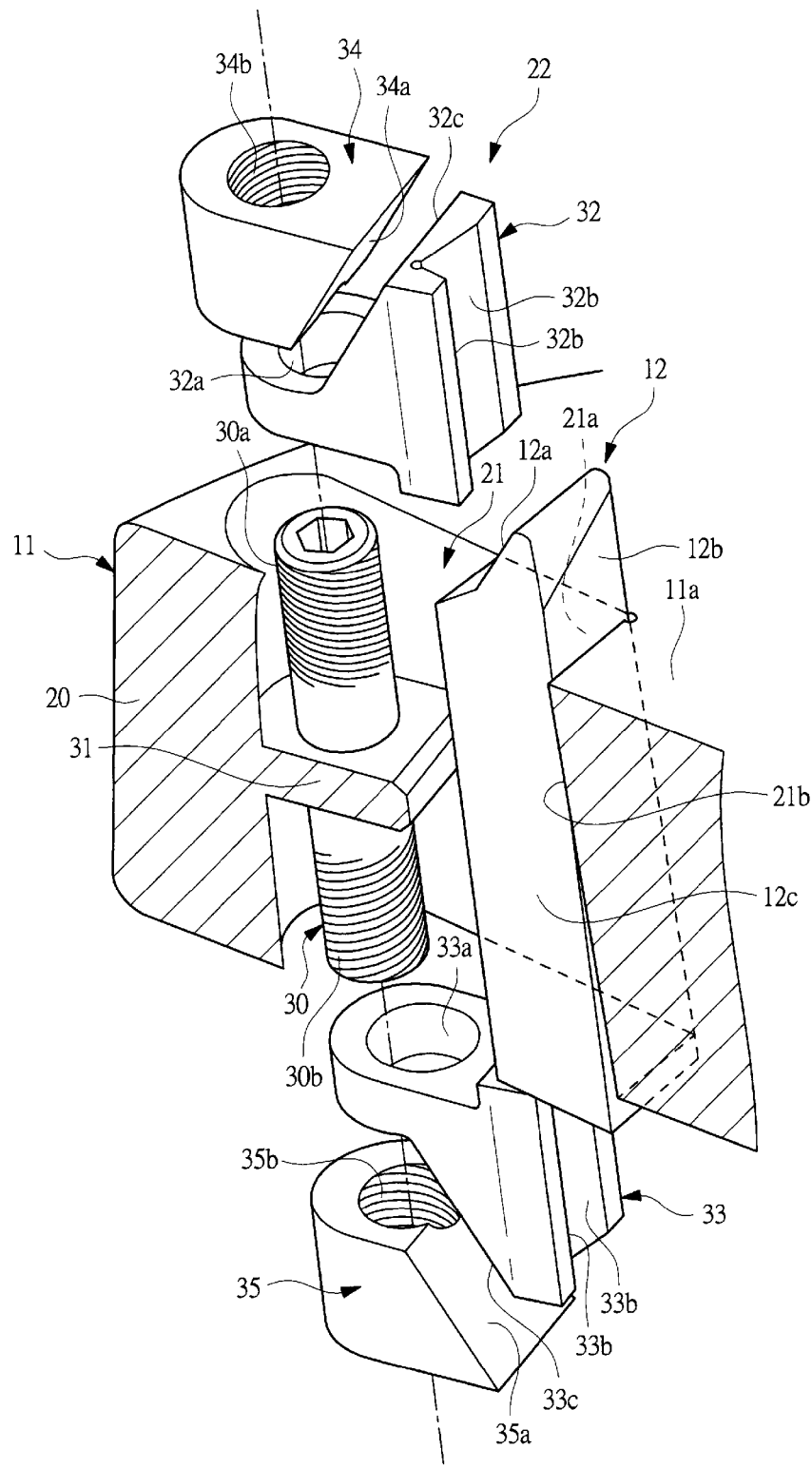
FIG. 5 is an exploded perspective view illustrating the installation configuration of a concave tooth surface blade.

FIG. 4 is a cross-sectional view along the section line a-a in FIG. 3, and illustrates the installed state of a concave tooth surface blade 12, and FIG. 5 is an exploded perspective view illustrating the installation configuration of a concave tooth surface blade 12. As illustrated in FIG. 4 and FIG. 5, the slot holes 21 that are formed in the disk section 20 of the main head body 11 comprise two installation reference surfaces 21a, 21b for coming in contact with and positioning the concave tooth surface blades 12. In this way, an installation reference surface 21a that functions as the first reference surface (reference surface), and an installation reference surface 21b that functions as a second reference surface (reference surface) are formed in one corner of the slot hole 21. Moreover, a partition wall section 31, which supports a bolt member (screw member) 30 of the fastening mechanism 22 such that it can rotate freely, is provided inside the slot holes 21 that are formed in the disk section 20.

The fastening mechanism 22 has a pair of holding pieces (holding members) 32, 33 that face each other by way of the partition wall 31, and a pair of tightening pieces (tightening members) 34, 35 that come in contact with the holding pieces 32, 33, respectively. Long holes 32a, 33a, through which the bolt member 30 passes, are formed in each of the holding pieces 32, 33, and contact surfaces (first holding surface, second holding surface) 32b, 33b are formed in the side surface of the concave tooth surface blade 12. In addition, inclined surfaces 32c, 33c, 34a, 35a are respectively formed on the holding pieces 32, 33 and the tightening pieces 34, 35 that face them. Moreover, the holding pieces 32, 33 and the tightening pieces 34, 35 come in contact with each other by way of these inclined surfaces 32c, 33c, 34a, 35a. Furthermore, male screw sections 30a, 30b that are in reverse phase from each other are formed on the end sections of the bolt member 30, and female screw sections 34b, 35b that correspond to these male screw sections 30a, 30b are formed in the tightening pieces 34, 35.

In this way, the fastening mechanism 22, which comprises the bolt member 30, holding pieces 32, 33 and tightening pieces 34, 35, fastens the base section 12c of the concave tooth surface blade 12 that is inserted into the slot hole 21 to the main head body 11. In other words, as illustrated in FIG. 4, after the base section 12c of the concave tooth surface blade 12 has been inserted into the slot hole 21, the bolt member 30 of the fastening mechanism 22 is tightened, which moves the tightening pieces 34, 35 closer together (in the direction of arrow 'a'), as well as moves the holding pieces 32, 33 such that they press the base section 12c against the installation reference surfaces 21a, 21b (in the direction of arrow 'b'). That is, by tightening the bolt member 30, the tightening pieces 34, 35 move in the axial direction of the bolt member 30, which causes the holding pieces 32, 33 to move in the radial direction of the bolt member 30. In doing so, the concave tooth surface blade 12 that is inserted into the slot hole 21 is fastened in a state pressed against the installation reference surfaces 21a, 21b of the slot hole 21. Moreover, as illustrated in FIG. 3, the installation reference surfaces 21a, 21b of the slot hole 21 are formed on sides opposite to the direction of rotation of the main head body 11 (sides that receives forces acting oppositely to the direction of rotation), so the stress that acts on the concave tooth surface blade 12 during cutting can be received by the installation reference surfaces 21a, 21b on the sides of the main head body 11.

In this way, the installation reference surfaces 21a, 21b of the slot hole 21 are formed in a direction such that they receive the cutting load (stress) that acts on the concave tooth surface blade 12. By doing so, it becomes possible for the main head body 11 to directly receive the cutting load, and not received by the fastening mechanism 22 that comprises a plurality of parts. In other words, the cutting load can be directly received by the main head body 11, which is a single part, so the concave tooth surface blade 12 does not become loose due to the cutting load, and it becomes possible to maintain the installation position of the concave tooth surface blade 12. This makes it possible to improve the cutting precision of the work W.

Moreover, the installation reference surfaces 21a, 21b of the slot hole 21 are formed such that they incline with respect to the direction of rotation of the main head body 11. By doing so, it becomes possible for the two installation reference surfaces 21a, 21b to surely receive the cutting load. As indicated by the arrow in FIG. 3 (direction of stress), the cutting load basically acts in directions opposing the direction of rotation of the main head body 11, however, the direction that the cutting load acts is not always a fixed direction, and the direction may fluctuate within a certain range during the cutting process from when the cutting portion 12a comes in contact with the tooth surface and until it becomes separated. In order for the main head body 11 to surely receive this kind of cutting load, instead of providing one installation reference surface that is perpendicular to the direction of rotation of the main head body 11, two installation reference surfaces 21a, 21b are provided such that they incline with respect to the direction of rotation of the main head body 11. As was described above, the direction that the cutting load acts fluctuates within a specified range, so the directions in which the installation reference surfaces 21a, 21b are formed are set to directions that receive the cutting load at least once during the cutting process of the tooth surface.

Furthermore, two contact surfaces 32b, 33b that come in contact with one corner of the bases section 12c of the concave tooth surface blade 12 is formed on the holding pieces 32, 33. By doing so, it becomes possible for the holding pieces 32, 33 to come in contact with one corner of the base section 12c, whose cross-sectional shape is quadrangular. In other words, it is possible to press the concave tooth surface blade 12 toward one corner that comprises the installation reference surfaces 21a, 21b as illustrated by the arrow 'X' in FIG. 3, without forming the cross-sectional shape of the base section 12c of the concave tooth surface blade 12 into a pentagonal shape. By doing so it is possible to form the cross-sectional shape of the base section 12c of the concave tooth surface blade 12 into a quadrangular shape, and thus it is possible to reduce the manufacturing cost of the concave tooth surface blade 12.

Figure 6A:
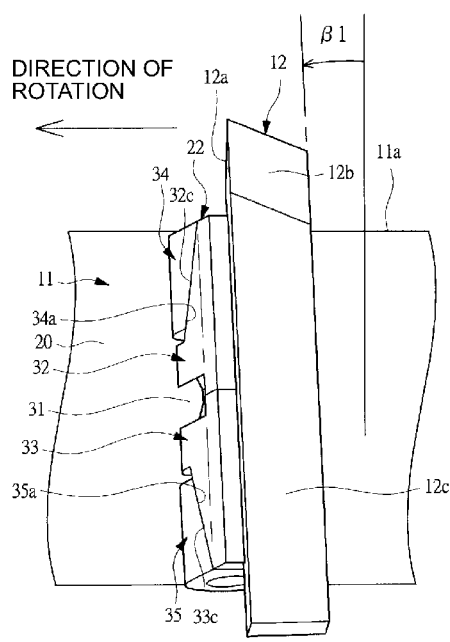
FIG. 6A is a cross-sectional view illustrating the installed state of a concave tooth surface blade as seen from direction 'b' in FIG. 3.
Figure 6B:
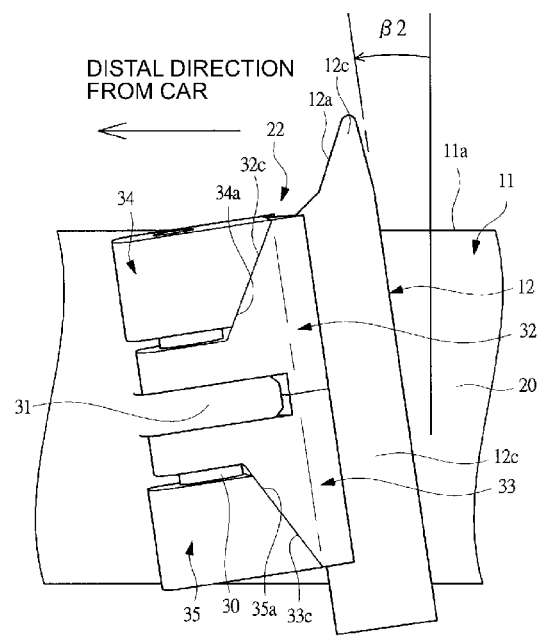
FIG. 6B is a cross-sectional view illustrating the installed state of a concave tooth surface blade as seen from direction 'c' in FIG. 3.

In addition, as illustrated in FIG. 3, the cutting portion 12a of the concave tooth surface blade 12 that is inserted into the slot hole 21 is tilted with respect to the line that connects the cutting point at a standard height position and the central axis of rotation (CAR) C of the main head body 11. This makes it possible for the cutting portion 12a of the concave tooth surface blade 12 to cut the work W at a specified rake angle $\alpha 1$. Here, FIG. 6A is a cross-sectional view illustrating the installed state of the concave tooth surface blade 12 as seen from the 'b' direction in FIG. 3, and FIG. 6B is a cross-sectional view illustrating the installed state of the concave tooth surface blade 12 as seen from the 'c' direction in FIG. 3. As illustrated in FIG. 6A, the concave tooth surface blade 12 is installed such that it faces the direction of rotation, and is tilted at a specified forward tilt angle $\beta 1$, and as illustrated in FIG. 4 and FIG. 6B, the concave tooth surface blade 12 is installed such that it faces in a distal direction from the central axis of rotation (CAR) of the main head body 11, and is tilted at a specified side tilt angle $\beta 2$. Here, a distal direction from the CAR is the direction toward the outside from the CAR of the main head body 11.

Figure 7:
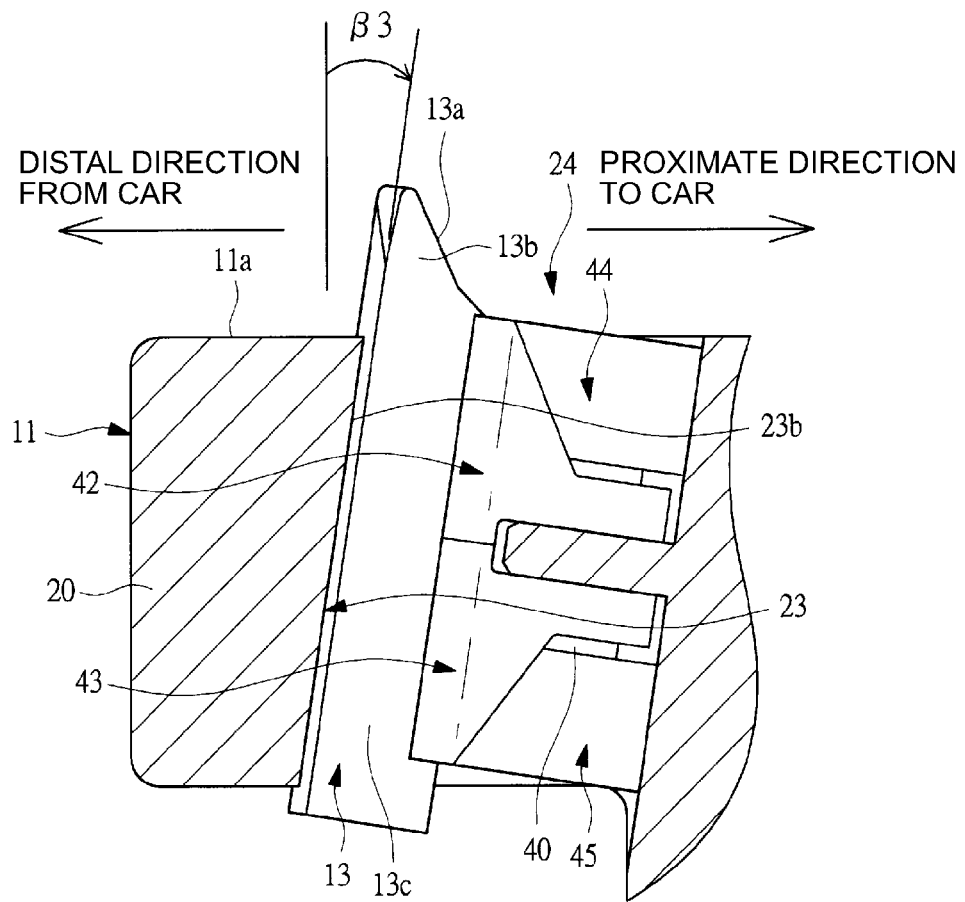
FIG. 7 is a cross-sectional view along section line d-d in FIG. 3, and illustrates the installed state of a convex surface blade.

As has been explained up to this point, the concave tooth surface blade 12 is installed at a specified rake angle $\alpha 1$, forward tilt angle $\beta 1$ and side tilt angle $\beta 2$ in the main head body 11 such that it can be freely mounted or removed. The convex tooth surface blade 13 is also constructed such that it is installed similar to that of the concave tooth surface blade 12, and is installed in the main head body 11 such that it can be freely mounted or removed. Here, FIG. 7 is a cross-sectional view illustrating the installed state of a convex tooth surface blade 13 along the section line d-d in FIG. 3. As illustrated in FIG. 7, the fastening mechanism 24 that fastens the convex tooth surface blade 13, similar to the fastening mechanism 22 described above, comprises a bolt member (screw member) 40, holding pieces (pressing members) 42, 43, and tightening pieces (tightening members) 44, 45. Moreover, as illustrated in FIG. 3 and FIG. 7, the slot hole 23 into which the base section 13c of the convex tooth surface blade 13 is inserted comprises two installation reference surfaces (first reference surface, second reference surface) 23a, 23b that come in contact with and position the convex tooth surface blade 13. Furthermore, as illustrated in FIG. 3, the convex tooth surface blade 13 is installed in the main head body 11 having a specified rake angle $\alpha 2$ and forward tilt angle; and as illustrated in FIG. 7, the convex tooth surface blade 13 is installed such that it faces in a proximate direction to the CAR and is tilted at a side tilt angle $\beta 3$. Here, a proximate direction to the CAR is the direction toward the CAR of the main head body 11.

Furthermore, the installation reference surfaces 23a, 23b of the slot hole 23 are formed on the opposite side from the direction of rotation of the main head body 11, so the stress that acts on the convex tooth surface blade 13 when cutting can be received by the installation reference surfaces 23a, 23b on the side of the main head body 11. In other words, the installation reference surfaces 23a, 23b of the slot hole 23 are formed in a direction such that they receive the cutting load (stress) that acts on the convex tooth surface blade 13 during cutting. By doing so, it becomes possible to directly receive the cutting load by the main head body 11, which is a single part, and thus it is possible to improve the cutting precision of the work W by preventing loosening of the convex tooth surface blade 13. As in the case of the installation reference surfaces 21a, 21b described above, the installation reference surfaces 23a, 23b of the slot hole 23 are provided such that they are inclined with respect to the direction of rotation of the main head body 11.

Also, as illustrated by the arrow (stress direction) in FIG. 3, when cutting a convex tooth surface 16 with the convex tooth surface blade 13, the cutting load acts on the distal direction from the CAR of the main head body 11 of the convex tooth surface blade 13. That is, a cutting load that comprises a component force in the distal direction acts on the convex tooth surface blade 13. Therefore, the convex tooth surface blade 13 is positioned further distally from the CAR of the main head body 11 than the fastening mechanism 24, and the fastening mechanism 24 is positioned further proximately to the CAR of the main head body than the convex tooth surface blade 13. By positioning the convex tooth surface blade 13 and the fastening mechanism 24 in this way, it becomes possible for the main head body 11 to directly receive the cutting load instead of the fastening mechanism 24 receiving the cutting load. This makes it possible to improve cutting precision of the work W by preventing loosening of the convex tooth surface blade 13. It is preferred that the work performed to position the fastening mechanism 24 on the inner circumference side of the main head body 11 be capable of being performed from the end surface side of the main head body 11 as in the case of the fastening mechanism 24, so that the work of replacing the convex tooth surface blade 13 can be performed easily.

Figure 8A:
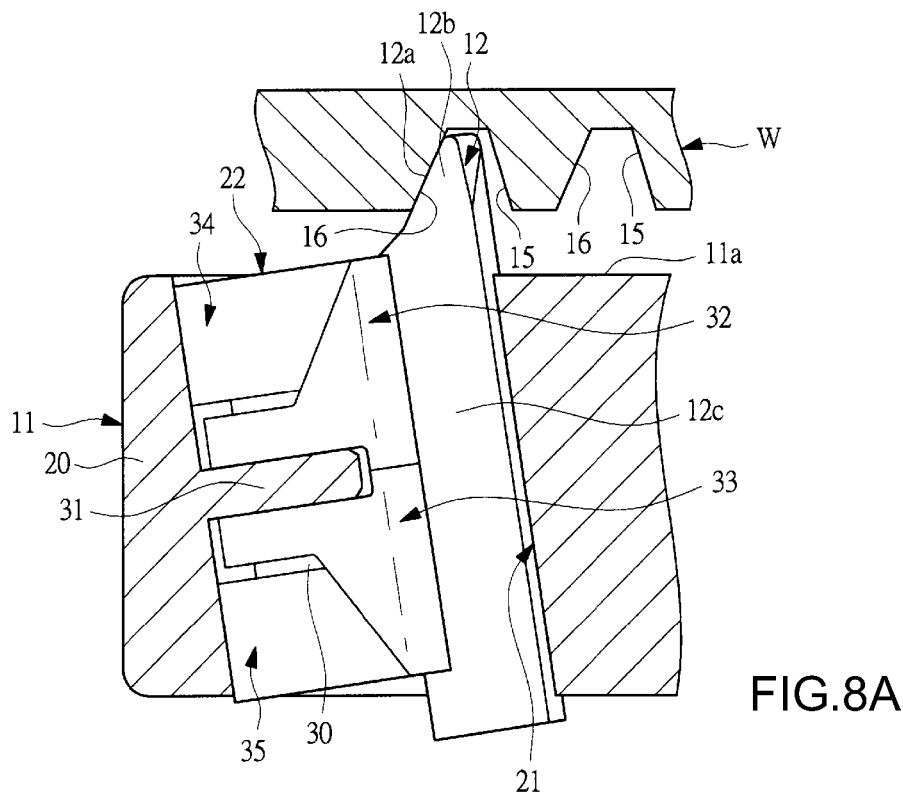
FIG. 8A is a diagram explaining the cutting state of a concave tooth surface by a concave tooth surface blade.
Figure 8B:
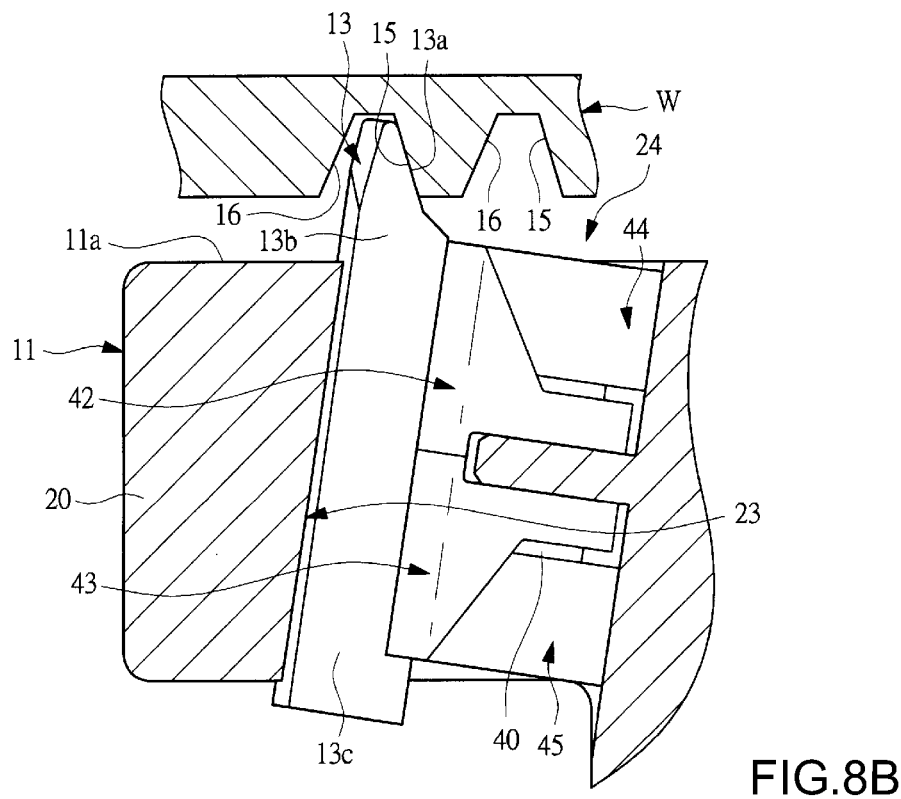
FIG. 8B is a diagram explaining the cutting state of a convex tooth surface by a convex tooth surface blade.

Continuing, the cutting state of the work W by the tool head 10 will be explained. FIG. 8A is a diagram explaining the cutting state of a concave tooth surface 15 by a concave tooth surface blade 12, and FIG. 8B is a diagram explaining the cutting state of a convex tooth surface 16 by a convex tooth surface blade 13. As illustrated in FIG. 8A, a concave tooth surface 15 of a bevel gear is formed in the work W by the cutting portion 12a of a concave tooth surface blade 12, and as illustrated in FIG. 8B, a convex tooth surface 16 of a bevel gear is formed in the work W by the cutting portion 13a of a convex tooth surface blade 13. By tilting the concave tooth surface blades 12 distally from the CAR, and tilting the convex tooth surface blades 13 proximately to the CAR in this way, it is possible to lower the cost of grinding the concave tooth surface blades 12 and the convex tooth surface blades 13. The reason for that will be explained below.

Figure 9A:
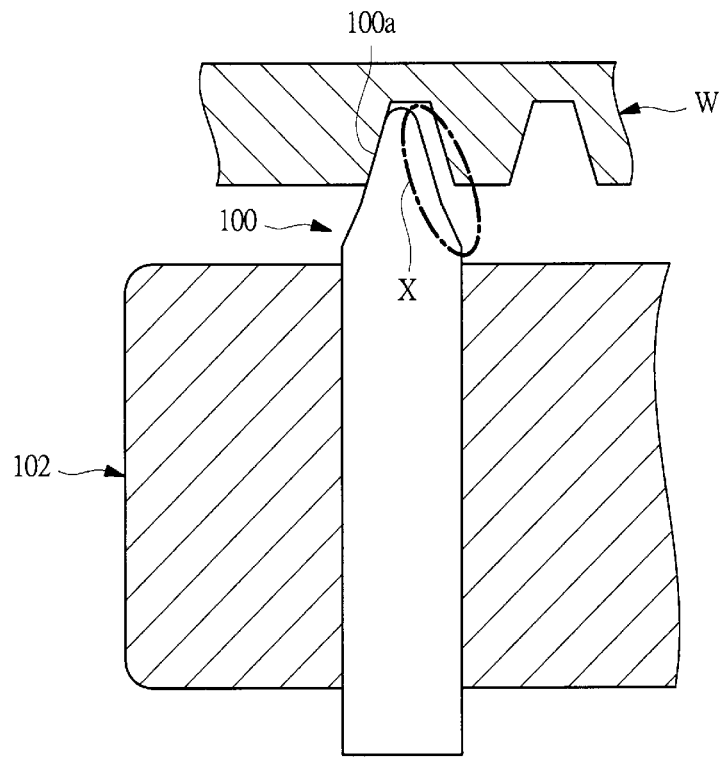
FIG. 9A is a diagram explaining a conventional example of perpendicular installation of a concave tooth surface blade.
Figure 9B:
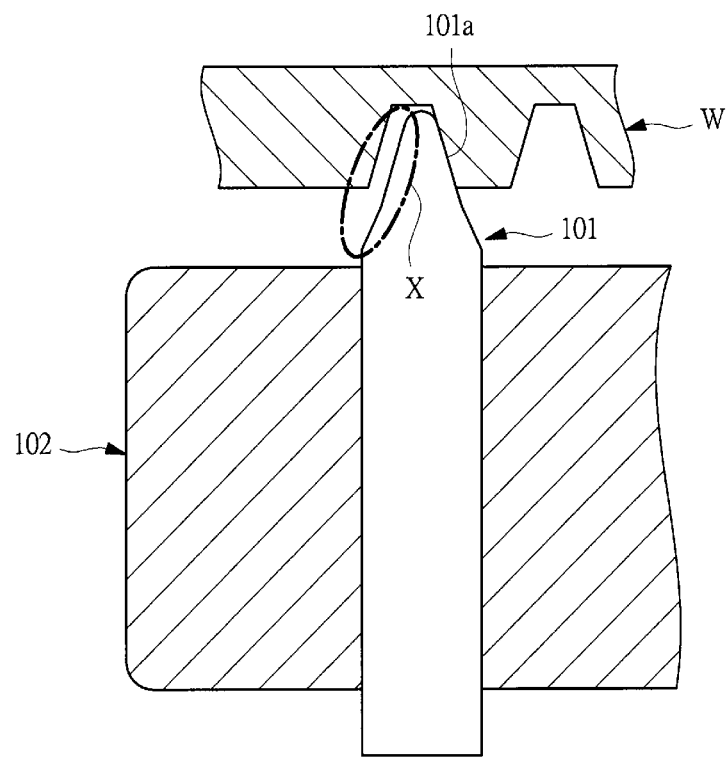
FIG. 9B is a diagram explaining a conventional example of perpendicular installation of a convex tooth surface blade.

FIG. 9A is a diagram explaining a conventional example of perpendicular installation of a concave tooth surface blade 100, and FIG. 9B is a diagram explaining a conventional example of perpendicular installation of a convex tooth surface blade 101. As illustrated in FIG. 9A and FIG. 9B, when a concave tooth surface blade 100 and a convex tooth surface blade 101 are perpendicularly installed with respect to the main head body 102, in order to avoid interference with a tooth surface that faces a tooth surface being cut, it is necessary to grind the blades 100, 101 a great deal on the side opposite the cutting portions 100a, 101a as illustrated by 'X' in the figures, which makes it difficult to lower the cost of grinding the blades 100, 101. However, in the case of the tool head of the present invention, the concave tooth surface blades 12 and convex tooth surface blades 13 are tilted in a distal or proximate direction to the CAR as illustrated in FIG. 8A and FIG. 8B, so they are in a positional relationship that makes it difficult for the blades 12, 13 to come in contact with the tooth surface on the side not being cut. By doing so, it is possible to reduce or eliminate the amount of grinding on the sides opposite from the cutting portions 12a, 13a of the blades 12, 13, so it becomes possible to lower the processing cost of the blades 12, 13.

Figure 10A:
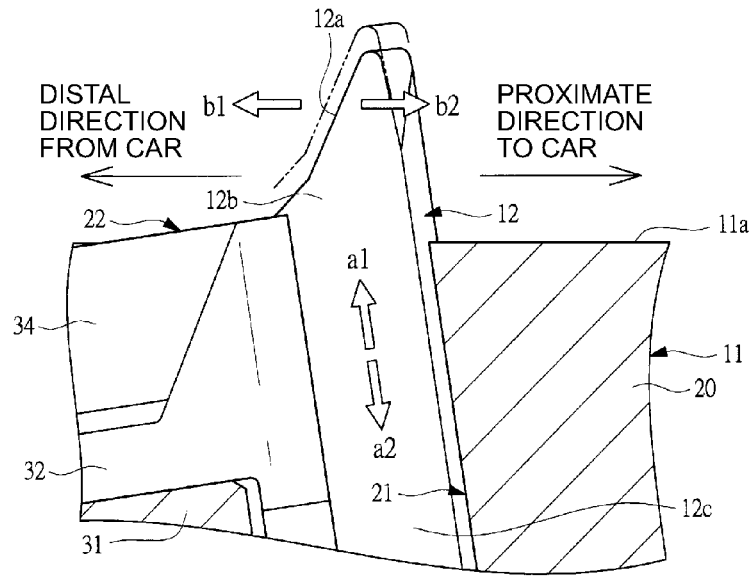
FIG. 10A is a diagram explaining the relationship between the protruding amount of a concave tooth surface blade and the position in the distal or proximate direction to the central axis of rotation (CAR) of the main head body of the cutting portion of the blade.
Figure 10B:
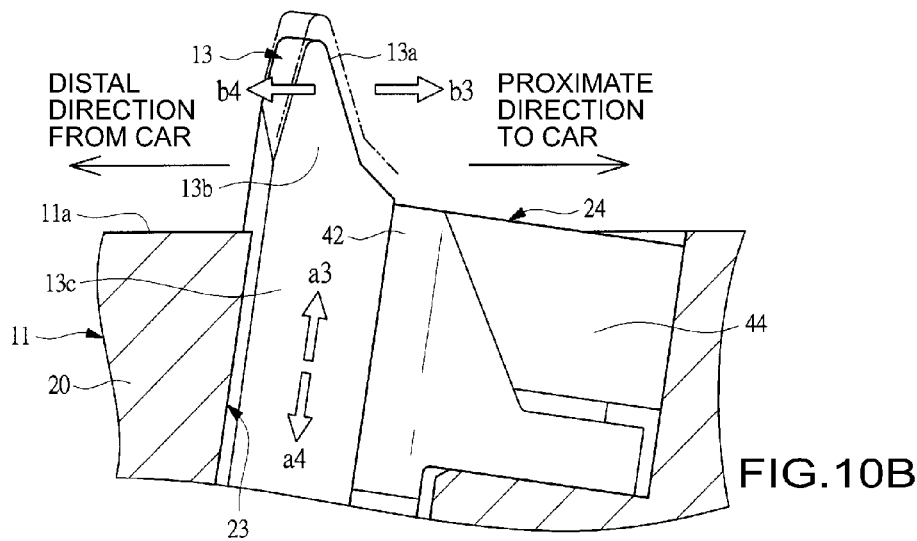
FIG. 10B is a diagram explaining the protruding amount of a convex tooth surface blade and the position in the distal or proximate direction to the CAR of the cutting portion of the blade.

In addition, as was described above, not only are the concave tooth surface blades 12 and convex tooth surface blades 13 installed in the main head body 11 such that they are tilted in a distal or proximate direction to the CAR, by using a fastening mechanism 22, 24, it is possible the fasten the blades at a discretionary protruding amount. By changing the amount of protrusion of the tilted blades 12, 13 in this way, it becomes possible to move the cutting portions 12a, 13a of the blades 12, 13 in the radial direction. Here, FIG. 10A is a diagram explaining the relationship between the protruding amount of a concave tooth surface blade 12 and the position in a distal/proximate direction of the cutting portion 12a of the blade; and FIG. 10B is a diagram explaining the protruding amount of a convex tooth surface blade 13 and the position in a distal/proximate direction of the cutting portion 13a of the blade. As illustrated in FIG. 10A, when the amount of protrusion of a concave tooth surface blade 12 is increased (arrow a1), the cutting portion 12a of the concave tooth surface blade 12 moves in a distal direction to the CAR (arrow b1), and when the amount of protrusion of a concave tooth surface blade 12 is decreased (arrow a2), the cutting portion 12a of the concave tooth surface blade 12 moves in a proximate direction to the CAR (arrow b2). Moreover, as illustrated in FIG. 10B, when the amount of protrusion of a convex tooth surface blade 13 is increased (arrow a3), the cutting portion 13a of the convex tooth surface blade 13 moves in a proximate direction to the CAR (arrow b3), and when the amount of protrusion of a convex tooth surface blade 13 is decreased (arrow a4), the cutting portion 13a of the convex tooth surface blade 13 moves in a distal direction to the CAR (arrow b4).

Figure 11C:
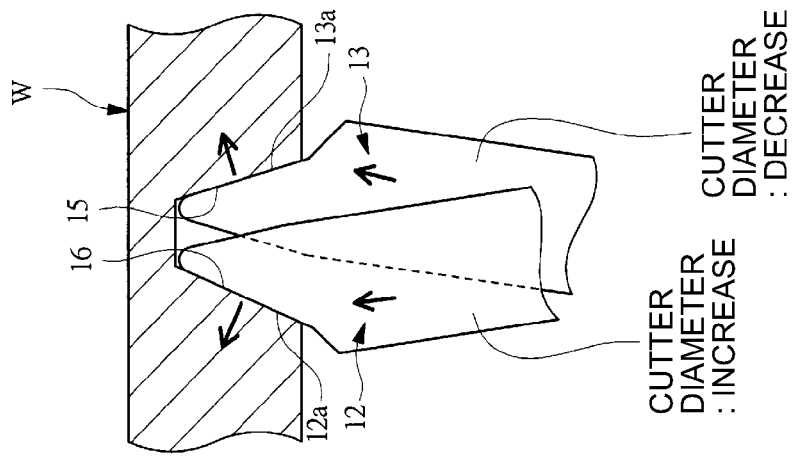
FIGS. 11A to 11C are diagrams explaining the relationship between the cutter diameter of the blade and the amount of cutting of the tooth surface.
Figure 11B:
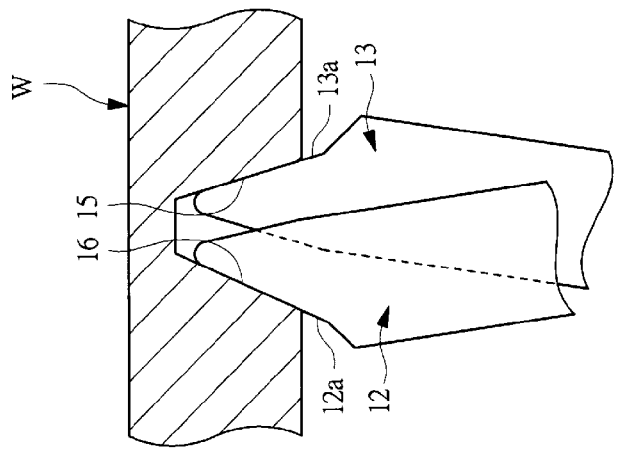
Figure 11A:
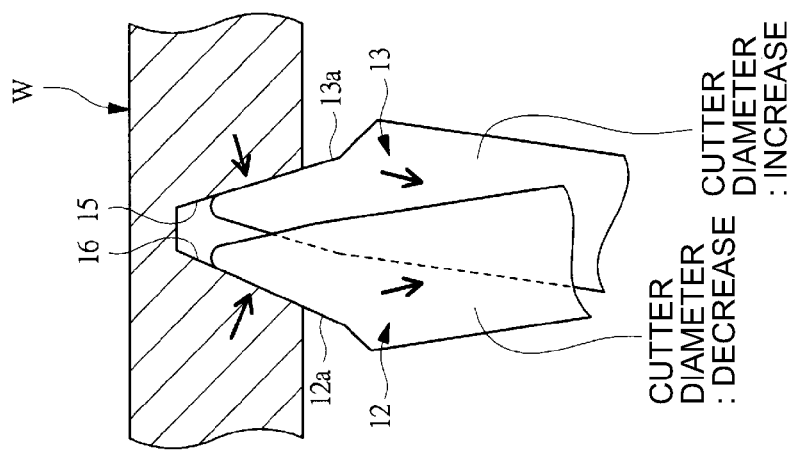
Figure 12A:
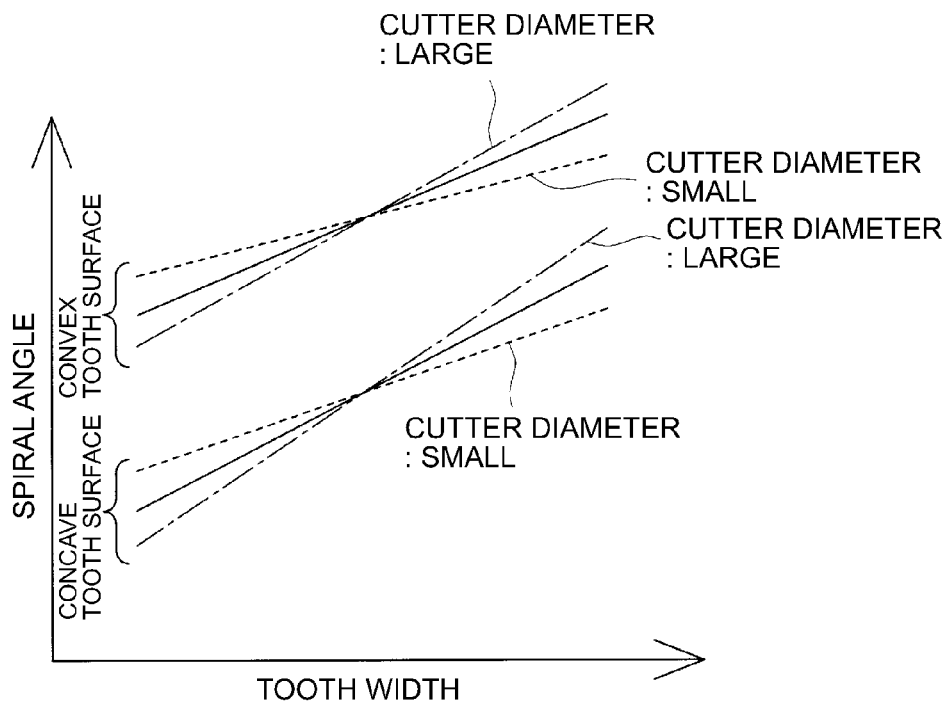
FIG. 12 is a graph illustrating the relationship between the cutter diameter of the blade and the spiral angle of the tooth surface.
Figure 12B:
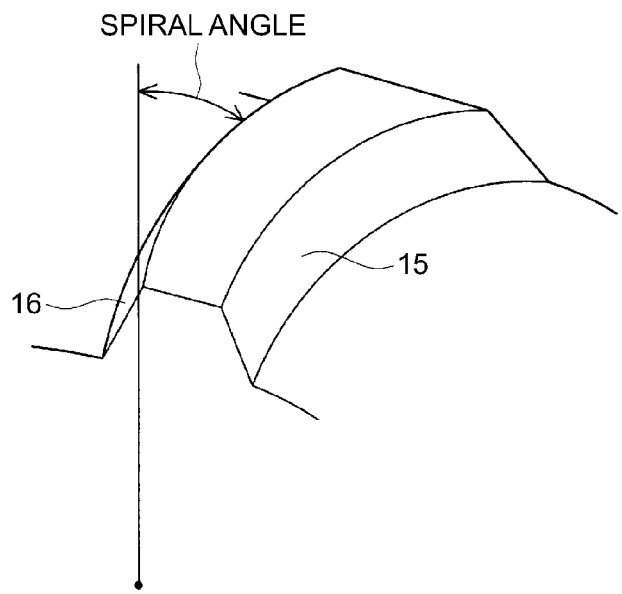
Figure 13:
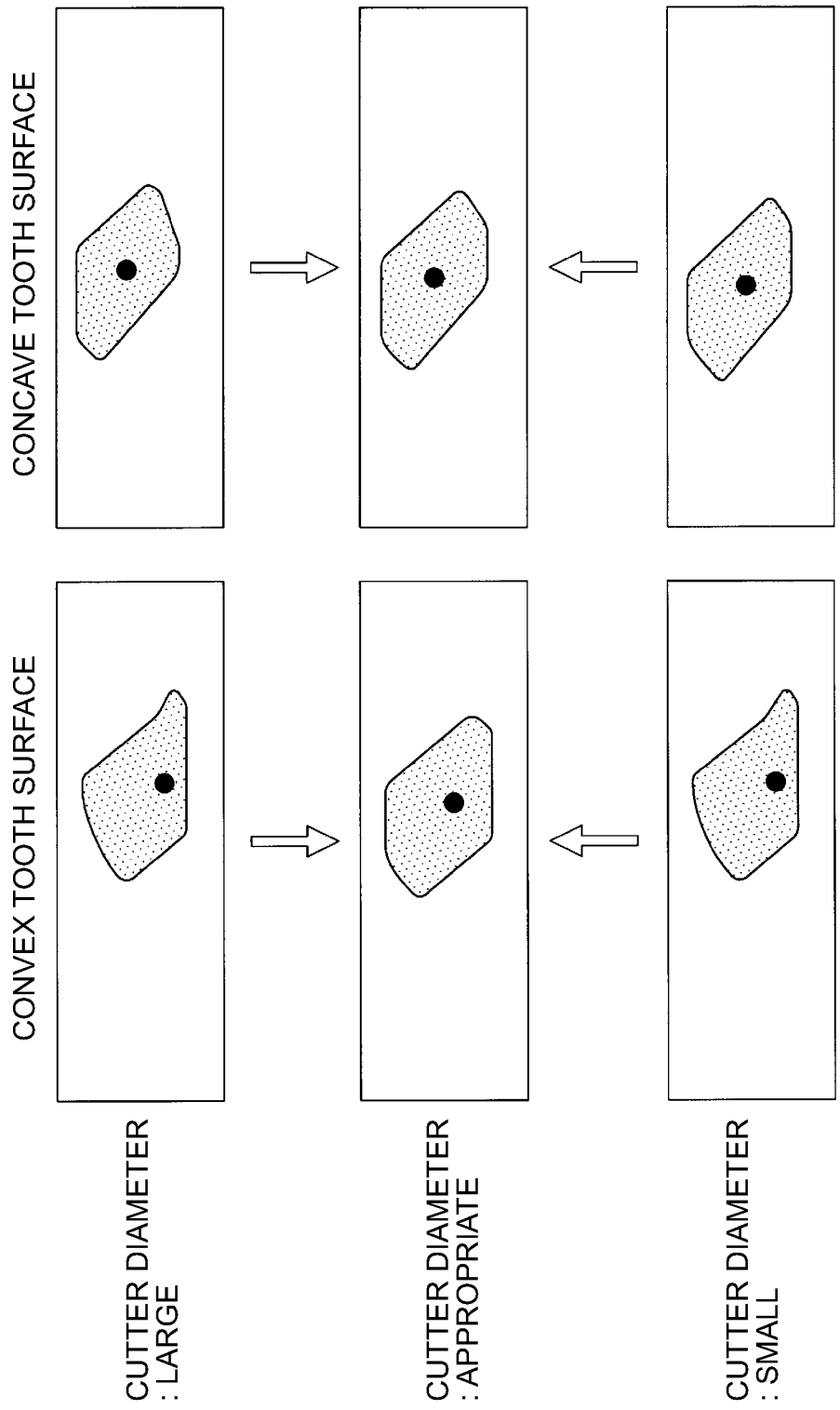
FIG. 13 is a diagram explaining the relationship between the cutter diameter and the area around the tooth surface.

FIGS. 11A to 11C are diagrams for explaining the relationship between the cutter diameter of the blades 12, 13 and the amount of cutting of the tooth surface. Moreover, FIG. 12 is a graph illustrating the relationship between the cutter diameter of the blades 12, 13 and the spiral angle of the tooth surfaces 15, 16. Furthermore, FIG. 13 is a diagram for explaining the relationship between the cutter diameter of the blades 12, 13 and the area around the tooth surfaces 15, 16.

As illustrated in FIGS. 11A to 11C, when the protruding amount of the blades 12, 13 is reduced, the cutting portion 12a of the concave tooth surface blade 12 moves in a proximate direction to the CAR and the cutter diameter (distance from the central axis of rotation (CAR) C to the cutting portion 12a) decreases, and the cutting portion 13a of the convex tooth surface blade 13 moves in a distal direction to the CAR and the cutter diameter (distance from the central axis of rotation (CAR) C to the cutting portion 13a) increases, so the amount of cutting of the concave tooth surface 15 and the convex tooth surface 16 increases. Moreover, when the protruding amount of the blades 12, 13 is increased, the cutting portion 12a of the concave tooth surface blade 12 moves in a distal direction to the CAR and the cutter diameter increases, and the cutting portion 13a of the convex tooth surface blade 13 moves in a proximate direction to the CAR and the cutter diameter decreases, so the cutting amount of the concave tooth surface 15 and the convex tooth surface 16 is reduced. In addition, as illustrated in FIG. 12, by changing the cutter diameter by changing the protruding amount of the blades 12, 13, it becomes possible to change the spiral angle of the concave tooth surface 15 and convex tooth surface 16. The spiral angle is the torsional angle of the tooth that is formed in the work W. By changing the cutter diameter of the concave tooth surface blade 12 and convex tooth surface blade 13 in this way, it is possible to change the amount of cutting and the spiral angle, so it becomes possible to correct the shape of the tooth surface of the concave tooth surface 15 and convex tooth surface 16. In other words, as illustrated in FIG. 13, by changing the cutter diameter by changing the protruding amount of the blades 12, 13, it becomes possible to adequately adjust the area around the concave tooth surface 15 and convex tooth surface 16.

As was explained up to this point, the concave tooth surface blade 12 and convex tooth surface blade 13 are tilted in a distal/proximate direction, so by changing the protruding amount of the concave tooth surface blade 12 and convex tooth surface blade 13, it becomes possible to move the cutting portions 12a, 13a in a distal/proximate direction. That is, it is possible to adjust the cutter diameter of the concave tooth surface blade 12 and the convex tooth surface blade 13, so it becomes possible to easily correct the shape of the tooth surface of the concave tooth surface 15 and convex tooth surface 16. Also, by tilting the concave tooth surface blade 12 and convex tooth surface blade 13 in a distal/proximate direction, it is becomes difficult for the blades 12, 13 to interfere with the tooth surface, so it is possible to reduce or eliminate the grinding mount of the blades 12, 13, and thus it is possible to lower the grinding cost of the blades 12, 13.

The present invention is not limited to the embodiment described above, and can be modified within a range that does not depart from the scope of the invention. For example, in the case illustrated in the figures, the concave tooth surface blades 12 and convex tooth surface blades 13 are installed on one main head body 11, however, it is also possible to install just the concave tooth surface blades 12 on the main head body, or install just the convex tooth surface blades 13 on the main head body. Moreover, by using the tool head 10 of the present invention, it is possible to cut hypoid gears, spiral bevel gears and the like. Furthermore, by using the tool head 10 of the present invention, it is possible to cut inclined teeth bevel gears, as well as cut parallel depth bevel gears.

In the case illustrated in the figures, the concave tooth surface blades 12 are tilted in a distal direction to the CAR and installed, and the convex tooth surface blades 13 are tilted in a proximate direction to the CAR and installed, however, the direction of tilt is not limited to this. For example, depending on the shape of the cutting portion, the concave tooth surface blades can be tilted in a proximate direction to the CAR, and the convex tooth surface blades can be tilted in a distal direction to the CAR.

Furthermore, it is possible to adjust the cutter diameter of the concave tooth surface blades 12 and convex tooth surface blades 13, so it is possible to cut gears having different dimensions using one tool head 10. In other words, it is possible to improve the versatility of the tool head 10, and thus it is possible to reduce the cost of cutting gears.

Figure 14:
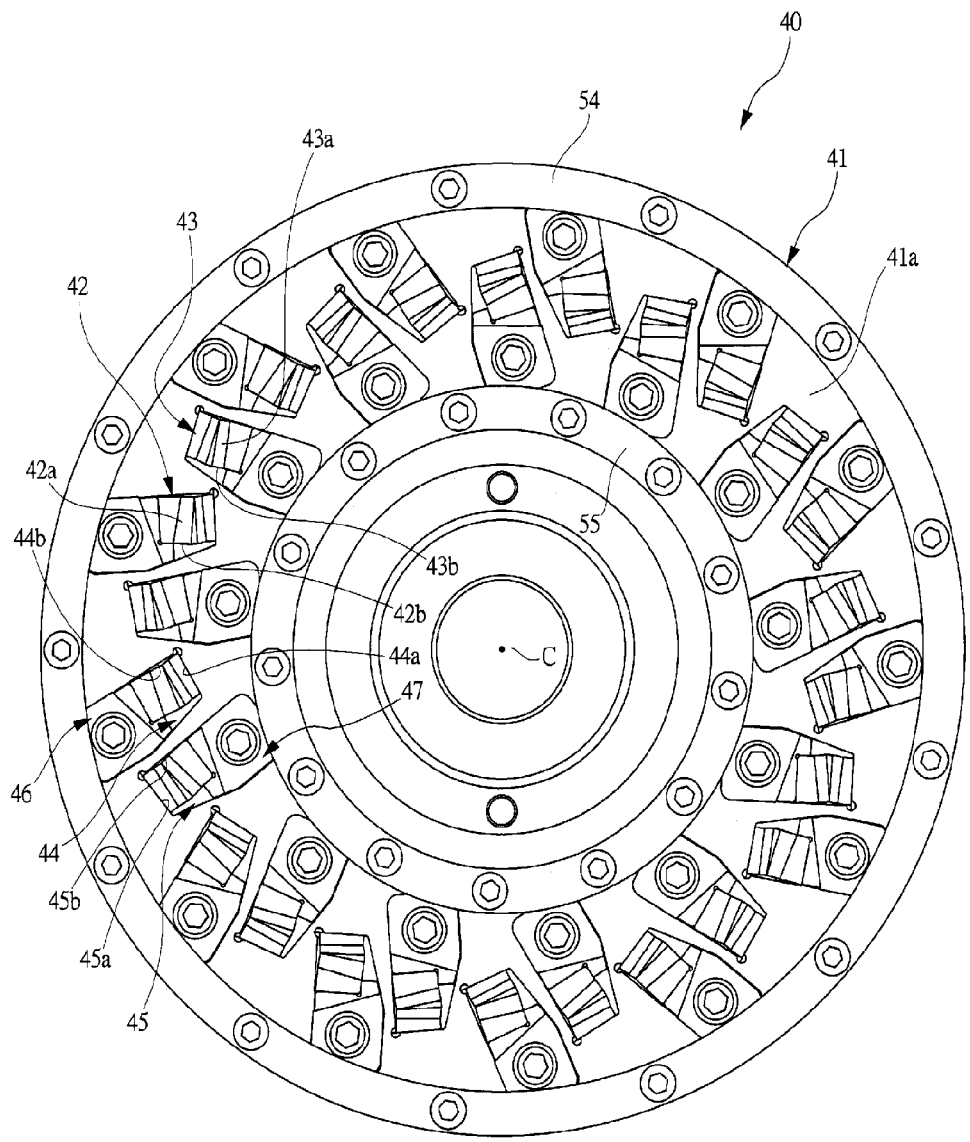
FIG. 14 is a top view illustrating a tool head of another embodiment of the present invention.
Figure 15:
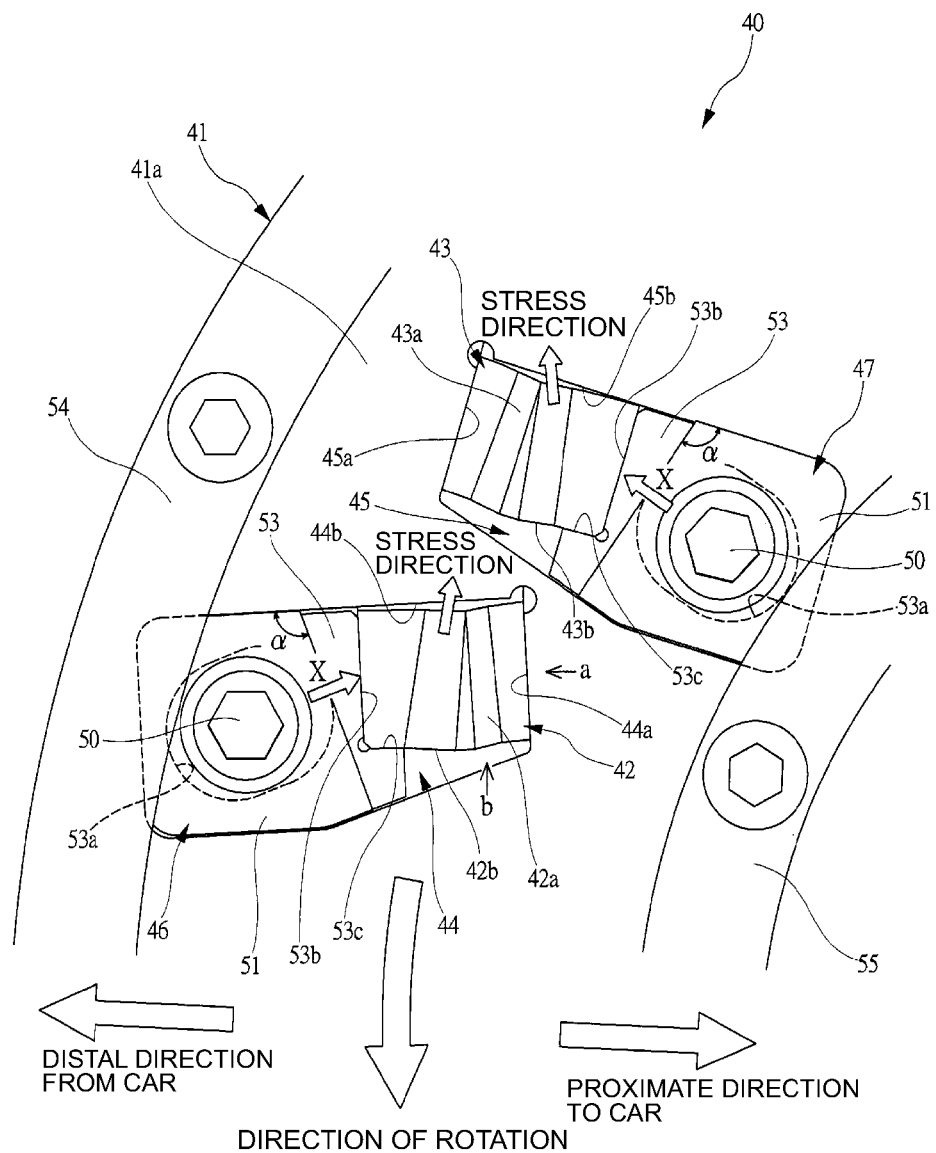
FIG. 15 is a partial enlarged top view of the tool head.

In the explanation above, in order to simplify adjustment of the cutter diameter, the concave tooth surface blades 12 and convex tooth surface blades 13 are tilted in a distal/proximate direction of the main head body 11. However, from the aspect of improving cutting precision by preventing loosening of the concave tooth surface blades 12 and convex tooth surface blades 13 due to the cutting load, the concave tooth surface blades 12 and convex tooth surface blades 13 do not need to be tilted in a distal/proximate direction of the main head body 11. Here, FIG. 14 is a top view illustrating a tool head 40 of another embodiment of the present invention. In addition, FIG. 15 is a partial enlarged top view illustrating the tool head 40. Furthermore, FIG. 16 is a top view illustrating the main head body 41 of the tool head 40.

As illustrated in FIG. 14, the tool head 40 has a disk shaped main head body 41, and a plurality of concave tooth surface blades (blades) 42 and convex tooth surface blades (blades) 43 are installed in that main head body 41. In addition, cutting portions 42b that cut the concave tooth surfaces 15 of a bevel gear are formed on the cutting sections 42a on the tip ends of the concave tooth surface blades 42. Similarly, cutting portions 43b that cut the convex tooth surfaces 16 of a bevel gear are formed on the cutting sections 43a on the tip ends of the convex tooth surface blades 43. Moreover, the blades 42, 43 that are installed in the main head body 41 are fastened such that the cutting portions 42b, 43b protrude from one end surface 41a of the main head body 41.

Figure 16:
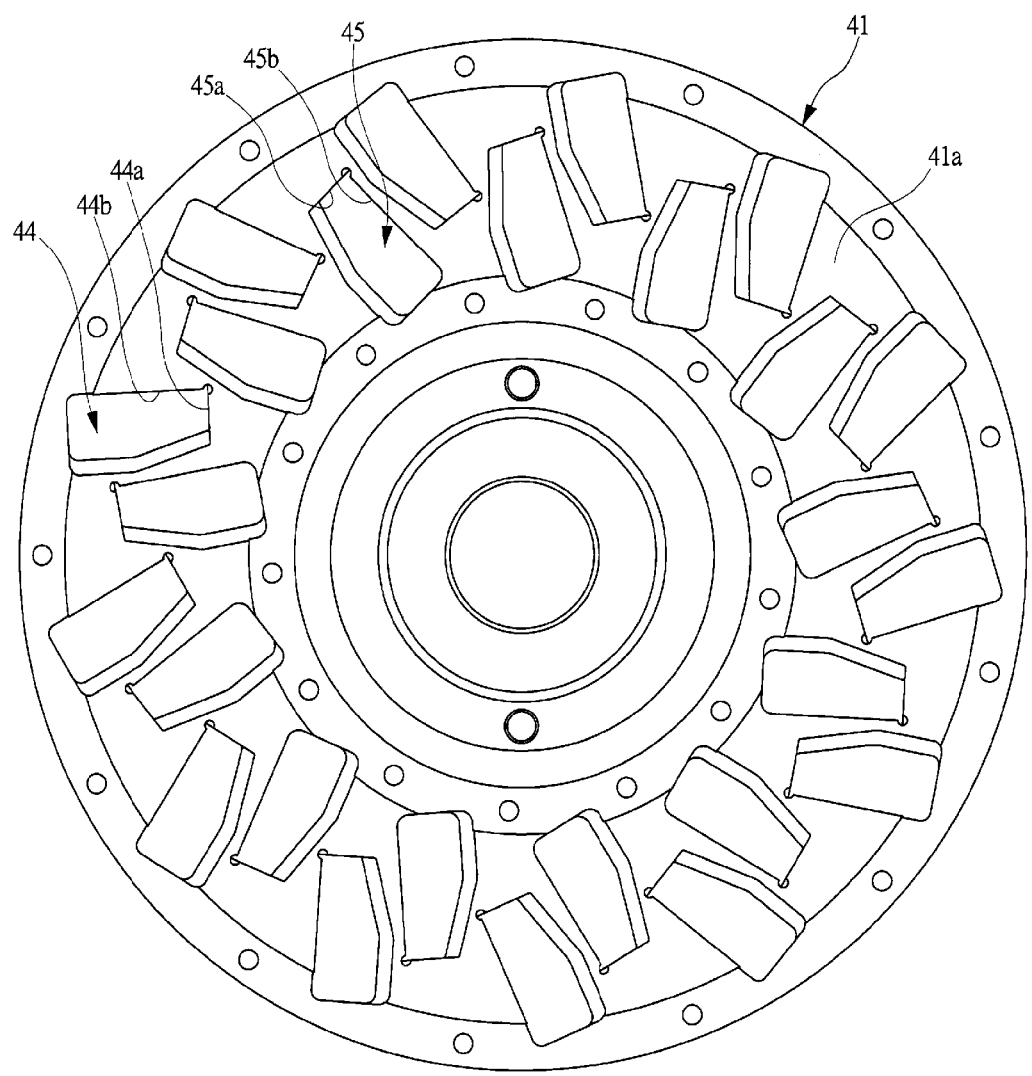
FIG. 16 is a top view illustrating the main head body of the tool head.

As illustrated in FIG. 14 to FIG. 16, a plurality of slot holes 44, 45, which function as installation holes, are formed in the main head body 41 in the circumferential direction thereof. These slot holes 44, 45 are formed such that they pass through the thickness direction of the main head body 41. Moreover, the slot holes 44 are formed around the outer circumference side of the main head body 41, and the concave tooth surface blades 42 are installed in these slot holes 44. Furthermore, fastening mechanisms 46 are installed in the slot holes 44, and they fasten the concave tooth surface blades 42 so that they protrude a discretionary amount. On the other hand, the slot holes 45 are formed around the outer circumference side of the main head body 41, and the convex tooth surface blades 43 are installed in these slot holes 45. Furthermore, fastening mechanisms 47 are installed in the slot holes 45, and they fasten the convex tooth surface blades 43 so that they protrude a discretionary amount. The blades 42, 43 and fastening mechanisms 46, 47 are assembled in the slot holes 44, 45 in this way, so as illustrated in FIG. 16, the slot holes 44, 45 can be made large, thus making it possible to reduce the weight of the main head body 41.

Furthermore, as illustrated in FIG. 15 and FIG. 16, an installation reference surface 44a, which is a first reference surface (reference surface), and an installation reference surface 44b, which is a second reference surface (reference surface), are formed in one corner of the slot holes 44 that are provided in the main head body 41. In addition, the base section 42c of the concave tooth surface blade 42 that is accommodated inside the slot hole 44 comes in contact with the two installation reference surfaces 44a, 44b of the slot hole 44. By having the concave tooth surface blade 42 come in contact with the two installation reference surfaces 44a, 44b in this way, the concave tooth surface blade 42 is positioned in the main head body 41. Similarly, an installation reference surface 45a, which is a first reference surface (reference surface), and an installation reference surface 45b, which is a second reference surface (reference surface), are formed in one corner of the slot holes 45 that are provided in the main head body 41. In addition, the base section 43c of the convex tooth surface blade 43 that is accommodated inside the slot hole 45 comes in contact with the two installation reference surfaces 45a, 45b of the slot hole 45. By having the convex tooth surface blade 43 come in contact with the two installation reference surfaces 45a, 45b in this way, the convex tooth surface blade 43 is positioned in the main head body 41.

Figure 18:
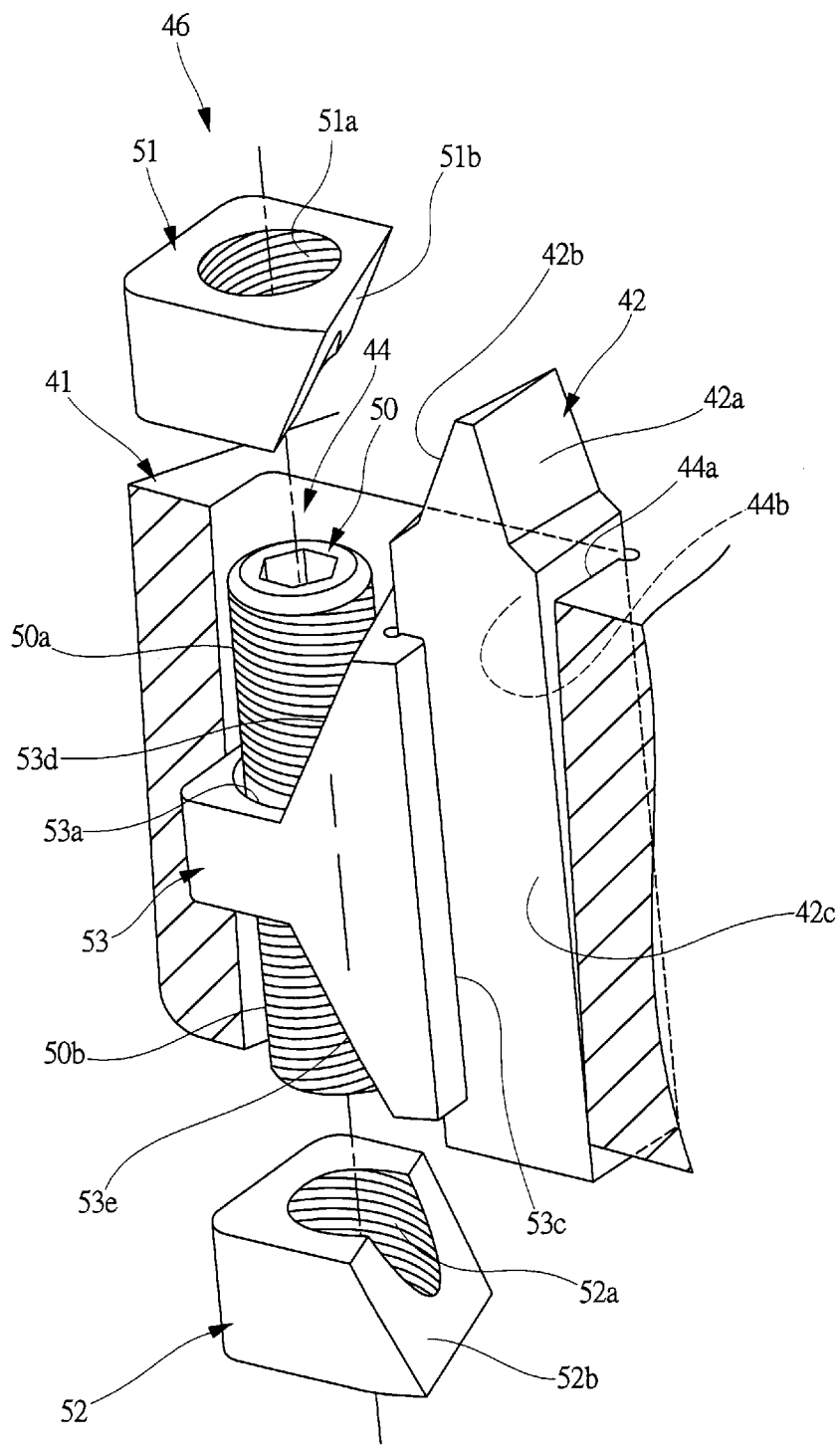
FIG. 18 is an exploded perspective view illustrating the installation configuration of a concave tooth surface blade.

Next, the fastening mechanism 46 that fastens a concave tooth surface blade 42 will be explained. The fastening mechanism 47 that fastens a convex tooth surface blade 43 has the same construction as the fastening mechanism 46 for a concave tooth surface blade 42, so the same reference numbers are used and an explanation thereof is omitted. FIG. 17A is a cross-sectional view illustrating the installed state of a concave tooth surface blade 42 as seen from the direction of arrow 'a' in FIG. 15, and FIG. 17B is a cross-sectional view illustrating the installed state of a concave tooth surface blade 42 as seen from the direction of arrow 'b' in FIG. 15. Moreover, FIG. 18 is an exploded perspective view illustrating the installation configuration of a concave tooth surface blade 42. Furthermore, FIGS. 19A and 19B are perspective views illustrating a holding piece 53 of a fastening mechanism 46.

As illustrated in FIG. 17A, FIG. 17B and FIG. 18, the fastening mechanism 46 has a screw member 50 that is accommodated in a slot hole 44, with male screws 50a, 50b, each having opposite phase from the other, being formed on the end sections of the screw member 50. In addition, the fastening mechanism 46 has a pair of opposing tightening pieces (first tightening member, second tightening member, tightening member) 51, 52, and a holding piece (holding member) 53 that comes in contact with these tightening pieces 51, 52. Female screw sections 51a, 52b that correspond to the male screw sections 50a, 50b are formed in the tightening pieces 51, 52, and inclined surfaces 51b, 52b that come in contact with the holding piece 53 are formed on the tightening pieces 51, 52. Moreover, as illustrated in FIGS. 19A and 19B, a long hole 53a through which the screw member passes is formed in the holding piece 53, and contact surfaces (first pressing surface, second pressing surface) 53b, 53c that come in contact with one corner of the base section 42c of a concave tooth surface blade 42 are formed on the holding piece 53. Furthermore, as illustrated in FIG. 19A, a first inclined surface 53d that comes in contact with the tightening piece 51, and a second inclined surface 53e that comes in contact with the tightening piece 52 are formed on the holding piece 53.

In this way, the fastening mechanism 46, comprising a screw member 50, a holding piece 53 and tightening pieces 51, 52, fasten the base section 42c of the concave tooth surface blade 42 that is inserted into the slot hole 44 to the main head body 41. In other words, as illustrated in FIG. 17B, by tightening the screw member 50 after the base section 42c of the concave tooth surface blade 42 has been inserted into the slot hole 44, the tightening pieces 51, 52 more toward each other (direction of arrow 'a'), and the holding piece 53 moves such that the bases section 42c of the concave tooth surface blade 42 presses against the installation reference surfaces 44a, 44b (direction of arrow 'b'). That is, by tightening the screw member 50, the tightening pieces 51, 52 move in the axial direction of the screw member 50, and the holding piece 53 moves in the radial direction of the screw member 50. By doing so, the concave tooth surface blade 42 is fastened by being pressed against the installation reference surfaces 44a, 44b of the slot hole 44.

As illustrated in FIG. 17B, the tightening pieces 51, 52 and the holding piece 53 come in contact by way of the inclined surfaces 51b, 52b, 53d and 53e, so it becomes possible to firmly fasten the concave tooth surface blade 42 by increasing the tightening force. Moreover, the pair of tightening pieces 51, 52 move toward each other, so it becomes possible to increase the installation precision of the concave tooth surface blade 42 without the holding piece 53, which is in contact with these tightening pieces 51, 52, moving along the screw member 50. Also, two inclined surfaces 53d, 53e are formed on the holding piece 53, so it is possible for one holding piece 53 to correspond to the two tightening pieces 51, 52, making it possible to reduce the number of parts of the fastening mechanism 46. As illustrated in FIG. 14 and FIG. 15, ring members 54, 55 that cover part of the fastening mechanisms 46, 47 are attached to the outer circumferential section and inner circumferential section of the main head body 41. By providing ring members 54, 55 in this way, it is possible to improve workability by preventing dropping of the fastening mechanisms 46, 47 when replacing blades.

Continuing, as illustrated in FIG. 15, the installation reference surfaces 44a, 44b that the concave tooth surface blade 42 comes in contact with are formed in a direction such that they receive the cutting load (stress) that acts on the concave tooth surface blade 42. By doing so, it becomes possible for the main head body 41 to directly receive the cutting load instead of the cutting load being received by the fastening mechanisms 46 that comprise a plurality of parts. In other words, it is possible for the main head body 41, which is a single part, to directly receive the cutting load, so it is possible to maintain the installation position of the concave tooth surface blades 42 without the concave tooth surface blades 42 becoming loose due to the cutting load. This makes it possible to improve the cutting precision of the work W.

Furthermore, the installation reference surfaces 44a, 44b of the slot hole 44 are formed such that they are inclined with respect to the direction of rotation of the main head body 41. By doing so, it is possible for the two installation reference surfaces 44a, 44b to surely receive the cutting load. As illustrated by the arrow in FIG. 15 (stress direction), the cutting load basically acts in a direction opposite to that of the direction of rotation of the main head body 41, however, the direction that the cutting load acts in is not always a fixed direction, and varies within a specified range during the cutting process from when the cutting portion 42b comes in contact with the tooth surface until it is separated. In order for the main head body 41 to surely receive this kind of cutting load, two installation reference surfaces 44a, 44b that incline in the direction of rotation of the main head body 41 have been provided instead of providing just one installation reference surface that is perpendicular to the direction of rotation of the main head body 41. As was described above, the direction that the cutting load acts in varies within a specified range, so the direction when forming the installation reference surfaces 44a, 44b is set such that the cutting load is received at least once during the cutting process of the tooth surface.

Moreover, two contact surfaces 53b, 53c, which come in contact with one corner of the base section 42c of a concave tooth surface blade 42, are formed on the holding piece 53. By doing so, it becomes possible for the holding piece 53 to come in contact with one corner of the base section 42c, which has a quadrangular cross section. In other words, as illustrated by the arrow 'X' in FIG. 15, it is possible to press the concave tooth surface blade 42 toward one corner having installation reference surfaces 44a, 44b without forming the base section 42c of the concave tooth surface blade 42 with a pentagonal cross-sectional shape. This makes it possible to form the cross-sectional shape of the base section 42c of the concave tooth surface blade 42 into a quadrangular shape, and thus it is possible to reduce the manufacturing cost of the concave tooth surface blade 42. As illustrated by reference symbol 'α' in FIG. 15, the inclined surfaces 51b, 52b, 53d, 53e of the tightening pieces 51, 52 and holding piece 53 are formed such that they are inclined with respect to the installation reference surface 44a. By doing so, as illustrated by arrow 'X', when tightening the screw member 50 of the fastening mechanism 46, it is possible to press the concave tooth surface blade 42 toward the corner comprising the installation reference surfaces 44a, 44b.

As has been explained up to this point, installation reference surfaces 44a, 44b are formed in a direction such that they receive the cutting load that acts on the concave tooth surface blades 42, so it is possible to improve the cutting precision of the work W by the concave tooth surface blades 42 without the concave tooth surface blades 42 becoming loose due to the cutting load. In addition, the convex tooth surface blades 43 also have a fastening structure that is the same as that of the concave tooth surface blades 42, so it is possible to improve the cutting precision of the work W by the convex tooth surface blades 43 without the convex tooth surface blades 43 becoming loose due to the cutting load. That is, the installation reference surfaces 45a, 45b of the slot holes 45 are formed in a direction such that thy receive the cutting load (stress) that acts on the convex tooth surface blades 43 during cutting. By doing so, it becomes possible for the main head body 41, which is a single part, to directly receive the cutting load, and it is possible to improve the cutting precision of the work W by preventing loosening of the convex tooth surface blades 43. As in the case of the installation reference surfaces 44a, 44b described above, the installation reference surfaces 45a, 45b of the slot holes 45 are inclined with respect to the direction of rotation of the main head body 41.

In addition, as illustrated by the arrow (stress direction) in FIG. 15, when cutting a convex tooth surface 16 with a convex tooth surface blade 43, the cutting load acts on the convex tooth surface blade 43 on a distal side to the CAR of the main head body 41. In other words, the cutting load, which comprises a distal component in relation to the CAR, acts on the convex tooth surface blade 43. Therefore, the convex tooth surface blade 43 is placed further distally to the CAR of the main head body 41 than the fastening mechanism 47, and the fastening mechanism 47 is placed further proximately to the CAR of the main head body 41 than the convex tooth surface blade 43. By arranging the convex tooth surface blade 43 and fastening mechanism 47 in this way, it becomes possible for the main head body 41 to directly receive the cutting load and not by the fastening mechanism 47. This makes it possible to improve the cutting precision of the work W by preventing loosening of the convex tooth surface blade 43. In order to place the fastening mechanism 47 on the inner circumferential side of the main head body 41, it is preferred that the work be capable of being performed from the side of the end surface 41a of the main head body 41 as in the case of the fastening mechanism 47, in order to maintain workability when replacing the convex tooth surface blade 43.

The present invention is not limited to the embodiment described above, and needless to say, can be modified or changed within the scope of the invention. For example, in the case illustrated in the figures, the concave tooth surface blades 42 and convex tooth surface blades 43 are installed on one main head body 41, however, it is also possible to install just concave tooth surface blades 42 on the main head body 41, or install just convex tooth surface blades 43 on the main head body 41. Moreover, by using the tool head 40 of the present invention, it is possible to cut hypoid gears, spiral bevel gears and the like. Furthermore, by using the tool head 40 of the present invention, it is possible to cut inclined teeth bevel gears, as well as cut parallel depth bevel gears.

The construction described above, can be presented in the abstract as the problem to be solved. The object of the invention is to improve cutting precision by preventing loosening of the blades. Moreover, the following can be presented in the abstract as the means for solving the problem. As illustrated in FIG. 15, slot holes 44 are formed in the main head body 11 in which concave tooth surface blades 42 are inserted, and slot holes 45 are formed in the main head body 11 in which convex tooth surface blades 43 are inserted. Two installation reference surfaces 44a, 44b are formed in one corner of the slot holes 44, and two installation reference surfaces 45a, 45b are formed in one corner of the slot holes 45. Fastening mechanisms 46 are assembled in the slot holes 44, and these fastening mechanisms 46 press the concave tooth surface blades 42 against the installation reference surfaces 44a, 44b. Fastening mechanisms 47 are also assembled in the slot holes 45, and these fastening mechanisms 47 press the convex tooth surface blades 43 against the installation reference surfaces 45a, 45b. The installation reference surfaces 44a, 44b are formed in a direction such that they receive the cutting load of the concave tooth surface blades 42. The installation reference surface 45a, 45b are also formed in a direction such that they receive the cutting load of the convex tooth surface blades 43. This makes it possible to improve the cutting precision.

What is claimed is:

1. A tool head for cutting bevel gears, comprising:
a disk shaped main head body in which installation holes having a first reference surface and second reference surface in one corner thereof are formed in a thickness direction of said main head body;
blades having a base section with a cross-section formed into a quadrangular shape that is inserted in the installation holes of said main head body, and cutting portions that are continuous with said base sections and that protrude from one end surface of said main head body; and
fastening mechanisms having a pressing member that are installed in said main head body and fasten said blades by pressing with a first pressing surface and a second pressing surface of the pressing member, a first surface and a second surface in one first corner formed on the base sections of said blades against said first reference surface and said second reference surface, the first pressing surface and the second pressing surface coming in contact with a second corner on the base sections formed oppositely to the first corner; wherein
said first reference surface and said second reference surface are formed oppositely to said first corner, and in a direction such that at least a majority of a cutting load acting on said blades acts in a direction toward said corner formed by said first reference surface and said second reference surface.

2. The tool head according to claim 1, wherein
said fastening mechanisms press said blades distally from said central axis of rotation of said main head body against said first reference surface and said second reference surface.

3. The tool head according to claim 1, wherein
said first reference surface and said second reference surface tilt with respect to a direction of rotation of said main head body.

4. The tool head according to claim 1, wherein
said fastening mechanism comprises:
a screw member that is accommodated in said installation hole;
a tightening member that is attached to said screw member and that can freely move in an axial direction of said screw member; and
a pressing member that can freely move in the axial direction of said screw member, and comes in contact with said tightening member by way of an inclined surface; and
said pressing member presses the base section of said blade against said first and second reference surfaces.

5. The tool head according to claim 4, wherein
a first tightening member that is installed on one end side of said screw member, and a second tightening member that is installed on the other end side of said screw member are provided as said tightening member; and
a first inclined surface that comes in contact with an inclined surface of said first tightening member, and a second inclined surface that comes in contact with an inclined surface of said second tightening member are formed on said pressing member.

6. The tool head according to claim 1, wherein
said blades are convex tooth surface blades for cutting convex tooth surfaces of said bevel gear.

7. A tool head for cutting bevel gears, comprising:
a disk shaped main head body in which installation holes each having a first reference surface and a second reference surface in one corner thereof are formed in a thickness direction thereof;
blades having base sections, each with a cross-section formed into a quadrangular shape, that are inserted into the installation holes of said main head body, and cutting portions that are continuous with the base sections and that protrude from one end surface of said main head body; and
fastening mechanisms, each having a pressing member, that are provided in the installation holes of said main head body, and that fasten said blades by pressing with a first pressing surface and a second pressing surface of the pressing member, a first surface and a second surface in one first corner formed on the base section of said blades against the first reference surface and the second reference surface of said installation holes, the first pressing surface and the second pressing surface coming in contact with a second corner on the base sections formed oppositely to the first corner; wherein
said blades are located distally from a CAR of said main head body than said fastening mechanisms,
said fastening mechanisms are located proximately to the CAR of said main head body than said blades; and
said first reference surface and said second reference surface are formed oppositely to said first corner, and in a direction such that at least a majority of a cutting load acting on said blades acts in a direction toward said corner formed by said first reference surface and said second reference surface.

8. The tool head according to claim 7, wherein said fastening mechanism comprises:
a screw member that is accommodated in said installation hole;
a tightening member that is attached to said screw member and that can freely move in an axial direction of said screw member; and
a pressing member that can freely move in the axial direction of said screw member, and comes in contact with said tightening member by way of an inclined surface; and
said pressing member presses the base section of said blade against said first and second reference surfaces.

9. The tool head according to claim 8, wherein
a first tightening member that is installed on one end side of said screw member, and a second tightening member that is installed on the other end side of said screw member are provided as said tightening member; and
a first inclined surface that comes in contact with an inclined surface of said first tightening member, and a second inclined surface that comes in contact with an inclined surface of said second tightening member are formed on said pressing member.

10. The tool head according to claim 7, wherein
said blades are convex tooth surface blades for cutting convex tooth surfaces of said bevel gear.

* * * * *